(12) United States Patent
Cho et al.

(10) Patent No.: US 11,513,650 B2
(45) Date of Patent: Nov. 29, 2022

(54) TRANSPARENT TOUCH DISPLAY DEVICE

(71) Applicant: LG Display Co., Ltd., Seoul (KR)

(72) Inventors: Namwook Cho, Gyeonggi-do (KR);
EuiTae Kim, Gyeonggi-do (KR);
KiSeob Shin, Gyeonggi-do (KR);
Dongho Choi, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/319,976

(22) Filed: May 13, 2021

(65) Prior Publication Data
US 2021/0397305 A1  Dec. 23, 2021

(30) Foreign Application Priority Data
Jun. 19, 2020  (KR) .......................... 10-2020-0075297

(51) Int. Cl.
*G06F 3/044* (2006.01)
*G06F 3/047* (2006.01)

(52) U.S. Cl.
CPC ............ *G06F 3/0446* (2019.05); *G06F 3/047* (2013.01); *G06F 2203/04111* (2013.01); *G06F 2203/04112* (2013.01)

(58) Field of Classification Search
CPC combination set(s) only.
See application file for complete search history.

(56) References Cited

U.S. PATENT DOCUMENTS

| | | | |
|---|---|---|---|
| 2018/0182816 A1* | 6/2018 | Kang | .................. G06F 3/04164 |
| 2018/0182817 A1* | 6/2018 | Jo | ....................... H01L 27/3246 |

* cited by examiner

*Primary Examiner* — Deeprose Subedi
(74) *Attorney, Agent, or Firm* — Seed IP Law Group LLP

(57) ABSTRACT

Embodiments of the present disclosure relate to a transparent touch display device, and more particularly, to a transparent display device including a touch electrode having a low reflection structure. The touch electrode having the low reflection structure may include a mesh type sensor metal formed a plurality of openings, a sensor transmission layer on the sensor metal, and a sensor auxiliary metal on the sensor transmission layer. Part of the incident light incident on the upper surface of the sensor auxiliary metal is reflected from the upper surface of the sensor auxiliary metal, and another part of the incident light incident on the upper surface of the sensor auxiliary metal is reflected from the upper surface of the sensor metal after passing through the sensor auxiliary metal and the sensor transmission layer.

16 Claims, 17 Drawing Sheets

TRANSPARENT TOUCH DISPLAY DEVICE

CROSS-REFERENCE TO RELATED APPLICATIONS

This application claims the benefit and priority from Korean Patent Application No. 10-2020-0075297, filed in the Republic of Korea on Jun. 19, 2020, the entire contents of which are hereby incorporated by reference for all purposes as if fully set forth into the present application.

BACKGROUND

Technical Field

The present disclosure relates to a transparent touch display device.

Description of the Related Art

These days, display devices are being developed in various types, such as a liquid crystal display device and an organic light emitting display device. In addition, various display technologies and convergence technologies are being developed to meet various user needs.

For example, for various applications, transparent display devices through which light is transmitted and the background can be seen are gradually being developed. As another example, in addition to a function of displaying an image, a touch-based input function has been developed that enables a user to easily and intuitively input information or commands.

In order for a transparent touch display device to provide a touch-based input, a touch sensor configuration including touch electrodes and touch routing wirings must be formed on the panel.

BRIEF SUMMARY

The inventors of the present disclosure have recognized that the touch sensor configurations utilized in the related art may be a factor that lowers the transmittance of the transparent touch display device. The inventors have further appreciated that for this reason, the development of a transparent display device capable of providing high touch sensitivity while providing high transmittance has not been successful in the related art. The inventors have also recognized the technical problem of unwanted image anomalies occurring based on the touch sensor configurations designed to provide high transmittance in the related art. The inventors have provided one or more embodiments that address one or more technical problems in the related art including the above-mentioned problems.

One or more embodiments of the present disclosure provide a transparent touch display device including touch sensor configurations having a low reflection structure.

In addition, embodiments of the present disclosure provide a transparent touch display device that enables high transparency, high image quality, and high touch sensitivity.

In addition, embodiments of the present disclosure provide a transparent touch display device that enables high transparency, high image quality, and high touch sensitivity without increasing process complexity.

In additions, embodiments of the present disclosure can provide a transparent touch display device that includes a touch sensor structure and enables high transparency, prevention of image abnormalities and reduction of process complexity under a structure without a polarizing plate.

One or more embodiments of the present disclosure provide a transparent touch display device comprising: a display panel including a display area in which an image is displayed and a non-display area positioned outside the display area, wherein the display area includes a plurality of light emitting areas and a plurality of transmissive areas, and the display panel includes a plurality of subpixels corresponding to the plurality of light emitting areas, a plurality of data lines, a plurality of gate lines, and a plurality of touch electrodes; a data driving circuit configured to drive the plurality of data lines; a gate driving circuit configured to drive the plurality of gate lines; and a touch driving circuit configured to drive the plurality of touch electrodes.

Each of the plurality of touch electrodes includes a mesh-type sensor metal having a plurality of openings, a sensor transmission layer on the sensor metal, and a sensor auxiliary metal on the sensor transmission layer.

Part of an incident light incident on the upper surface of the sensor auxiliary metal is reflected from the upper surface of the sensor auxiliary metal, and another part of the incident light incident on the upper surface of the sensor auxiliary metal is reflected from the upper surface of the sensor metal after passing through the sensor auxiliary metal and the sensor transmission layer.

A phase difference between a first reflected light reflected from the upper surface of the sensor auxiliary metal and a second reflected light reflected from the upper surface of the sensor metal may be an odd multiple of a half wavelength.

embodiments of the present disclosure provide a transparent touch display device comprising: a substrate including a display area in which an image is displayed and a non-display area positioned outside the display area, the display area including a plurality of light emitting areas and a plurality of transmissive areas; a plurality of light emitting devices disposed over the substrate; an encapsulation layer disposed on the plurality of light emitting devices; and a plurality of touch electrodes disposed on or over the encapsulation layer.

Each of the plurality of touch electrodes includes a mesh-type sensor metal having a plurality of openings, a sensor transmission layer on the sensor metal, and a sensor auxiliary metal on the sensor transmission layer.

Part of an incident light incident on the upper surface of the sensor auxiliary metal is reflected from the upper surface of the sensor auxiliary metal, and another part of the incident light incident on the upper surface of the sensor auxiliary metal is reflected from the upper surface of the sensor metal after passing through the sensor auxiliary metal and the sensor transmission layer.

A phase difference between a first reflected light reflected from the upper surface of the sensor auxiliary metal and a second reflected light reflected from the upper surface of the sensor metal may be an odd multiple of a half wavelength.

According to embodiments of the present disclosure, it is possible to provide a transparent touch display device including touch sensor configurations having a low reflection structure.

According to embodiments of the present disclosure, it is possible to provide a transparent touch display device that enables high transparency, high image quality and high touch sensitivity.

According to embodiments of the present disclosure, it is possible to provide a transparent touch display device that enables high transparency, high image quality and high touch sensitivity without increasing process complexity.

According to embodiments of the present disclosure, it is possible to provide a transparent touch display device that includes a touch sensor structure and enables high transparency, prevention of image abnormalities and reduction of process complexity under a structure without a polarizing plate.

Other systems, methods, features and advantages will be or will become apparent to one with skill in the art upon examination of the following figures and detailed description. It is intended that all such additional systems, methods, features and advantages be included within this description, be within the scope of the present disclosure, and be protected by the following claims, nothing in this section should be taken as a limitation on those claims. Further aspects and advantages are discussed below in conjunction with embodiments of the disclosure. It is to be understood that both the foregoing general description and the following detailed description of the present disclosure are example and explanatory and are intended to provide further explanation of the disclosure as claimed.

BRIEF DESCRIPTION OF THE SEVERAL VIEWS OF THE DRAWINGS

The above and other aspects, features and advantages of the present disclosure will be more apparent from the following detailed description taken in conjunction with the accompanying drawings, in which.

Figure 1:
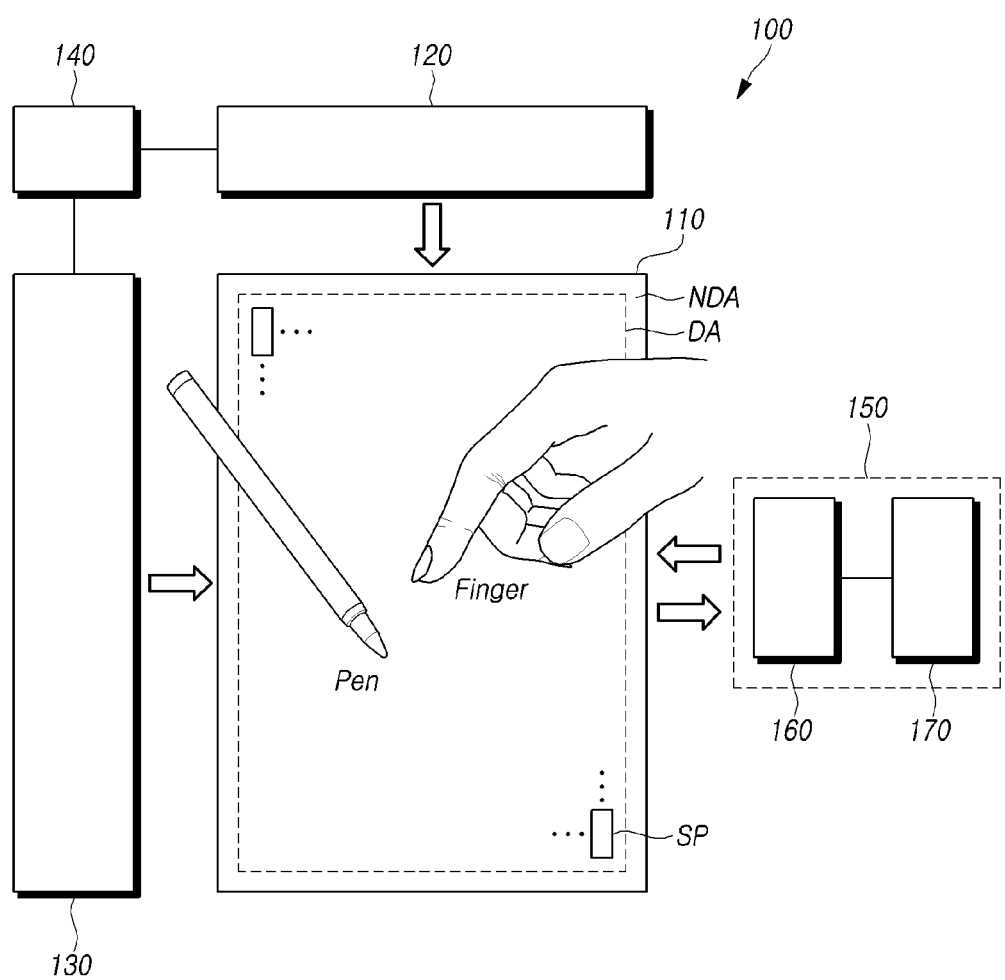
FIG. 1 is a system configuration diagram of a transparent touch display device according to embodiments of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a system configuration diagram of a transparent touch display device 100 according to embodiments of the present disclosure. Referring to FIG. 1, the transparent touch display device 100 may include a display panel 110, a data driving circuit 120, a gate driving circuit 130, and a display controller 140 as components for displaying an image.

The display panel 110 may include a display area DA in which an image is displayed and a non-display area NDA in which an image is not displayed. The non-display area NDA may be an outer area of the display area DA, and may also be referred to as a bezel area. The non-display area NDA may be an area visible from the front surface of the transparent touch display device 100 or may be an area that is bent and not visible from the front surface of the transparent touch display device 100.

The display panel 110 may include a plurality of subpixels SP. Also, the display panel 110 may further include various types of signal wires to drive the plurality of subpixels SP.

The transparent touch display device 100 may be various types of display devices including a LCD (Liquid Crystal Display) device, an OLED (Organic Light emitting Diode) display device, a micro LED (Light Emitting Diode) display device, a quantum dot display device, and the like.

The structure of each of the plurality of subpixels SP may vary according to the type of the transparent touch display device 100. For example, when the transparent touch display device 100 is a self-luminous display device (e.g., OLED display device, etc.) in which the subpixel SP emits light by itself, each subpixel SP may include a light emitting device (e.g., OLED, etc.) that emits light by itself, one or more transistors, and one or more capacitors.

For example, various types of signal lines may include a plurality of data lines transferring data signals and a plurality of gate lines transferring gate signals. Here, the data signals are also referred to as data voltages or image signals, and the gate signals are also referred to as scan signals.

The plurality of data lines and the plurality of gate lines may cross each other. Each of the plurality of data lines may be disposed while extending in a first direction. Each of the plurality of gate lines may be disposed while extending in the second direction.

Here, for example, the first direction may be a column direction and the second direction may be a row direction. The first direction is transverse to the second direction and the first and second directions are not necessarily perpendicular to each other. In this specification, a column direction and a row direction are relative to each other. For example, a column direction may be a vertical direction and a row direction may be a horizontal direction. For another example, a column direction may be a horizontal direction and a row direction may be a vertical direction.

The data driving circuit 120 is a circuit for driving the plurality of data lines, and may output data signals through the plurality of data lines. The gate driving circuit 130 is a circuit for driving the plurality of gate lines, and may output gate signals through the plurality of gate lines. The display controller 140 is a device for controlling the data driving circuit 120 and the gate driving circuit 130, and may control driving timings for the plurality of data lines and driving timings for the plurality of gate lines.

The display controller 140 supplies a data driving control signal to the data driving circuit 120 to control the data driving circuit 120, and supplies the gate driving control signal to the gate driving circuit 130 to control the gate driving circuit 130.

The data driving circuit 120 may supply data signals to the plurality of data lines according to the driving timing control of the display controller 140. The data driving circuit 120 may receive digital image data from the display controller 140, convert the received image data into analog data signals, and output them to the plurality of data lines.

The gate driving circuit 130 may supply gate signals to the plurality of gate lines according to timing control of the display controller 140. The gate driving circuit 130 may receive a first gate voltage corresponding to a turn-on level voltage and a second gate voltage corresponding to a turn-off level voltage together with various gate driving control signals (e.g., a start signal, a reset signal, etc.). The gate driving circuit 130 may generate gate signals having the first gate voltage or the second gate voltage, and supply the generated gate signals to the plurality of gate lines.

The transparent touch display device 100 may include a touch panel and a touch sensing circuit 150 to further provide a touch sensing function as well as an image display function. The touch sensing circuit 150 may sense the touch panel to detect whether a touch is generated by a touch object such as a finger or a pen, or detect a touch position.

The touch sensing circuit 150 may include a touch driving circuit 160 and a touch controller 170. The touch driving circuit 160 may drive and sense the touch panel to generate and output touch sensing data. The touch controller 170 may detect the occurrence of a touch or detect a touch position using touch sensing data output from the touch driving circuit 160.

The touch panel may include a plurality of touch electrodes as sensors. The touch panel may further include a plurality of touch routing wirings for electrically connecting the plurality of touch electrodes and the touch driving circuit 160. The touch panel or touch electrode may be also referred to as a touch sensor.

The touch panel may exist outside the display panel 110 or may exist inside the display panel 110. When the touch panel exists outside the display panel 110, the touch panel is referred to as an external type. When the touch panel is the external type, the touch panel and the display panel 110 may be separately manufactured and combined. The external touch panel may include a substrate and a plurality of touch electrodes on the substrate. When the touch panel is present inside the display panel 110, the touch panel is referred to as a built-in type (internal type, embedded type). When the touch panel is the built-in type, the touch panel may be formed in the display panel 110 during the manufacturing process of the display panel 110.

The touch driving circuit 160 may generate touch sensing data by supplying a touch driving signal to all or part of the plurality of touch electrodes and sensing at least one of the plurality of touch electrodes.

The touch sensing circuit 150 may perform touch sensing using a self-capacitance sensing method or a mutual-capacitance sensing method. When the touch sensing circuit 150 performs touch sensing in the self-capacitance sensing method, the touch sensing circuit 150 may perform touch sensing based on the capacitance between each touch electrode and a touch object (e.g., finger, pen, etc.). When the touch sensing circuit 150 performs touch sensing in the mutual-capacitance sensing method, the touch sensing circuit 150 may perform touch sensing based on capacitance between the touch electrodes.

According to the mutual-capacitance sensing method, the plurality of touch electrodes are divided into driving touch electrodes and sensing touch electrodes. The touch driving circuit 160 may drive driving touch electrodes and sense sensing touch electrodes. According to the self-capacitance sensing method, each of the plurality of touch electrodes may serve as a driving touch electrode and a sensing touch electrode. The touch driving circuit 160 may drive all or part of the plurality of touch electrodes and sense all or part of the plurality of touch electrodes.

For example, the touch driving circuit 160 and the touch controller 170 may be implemented as separate devices, or may be implemented by being integrated into a single device. For example, the touch driving circuit 160 and the data driving circuit 120 may be implemented by being integrated into a single device.

Figure 2:
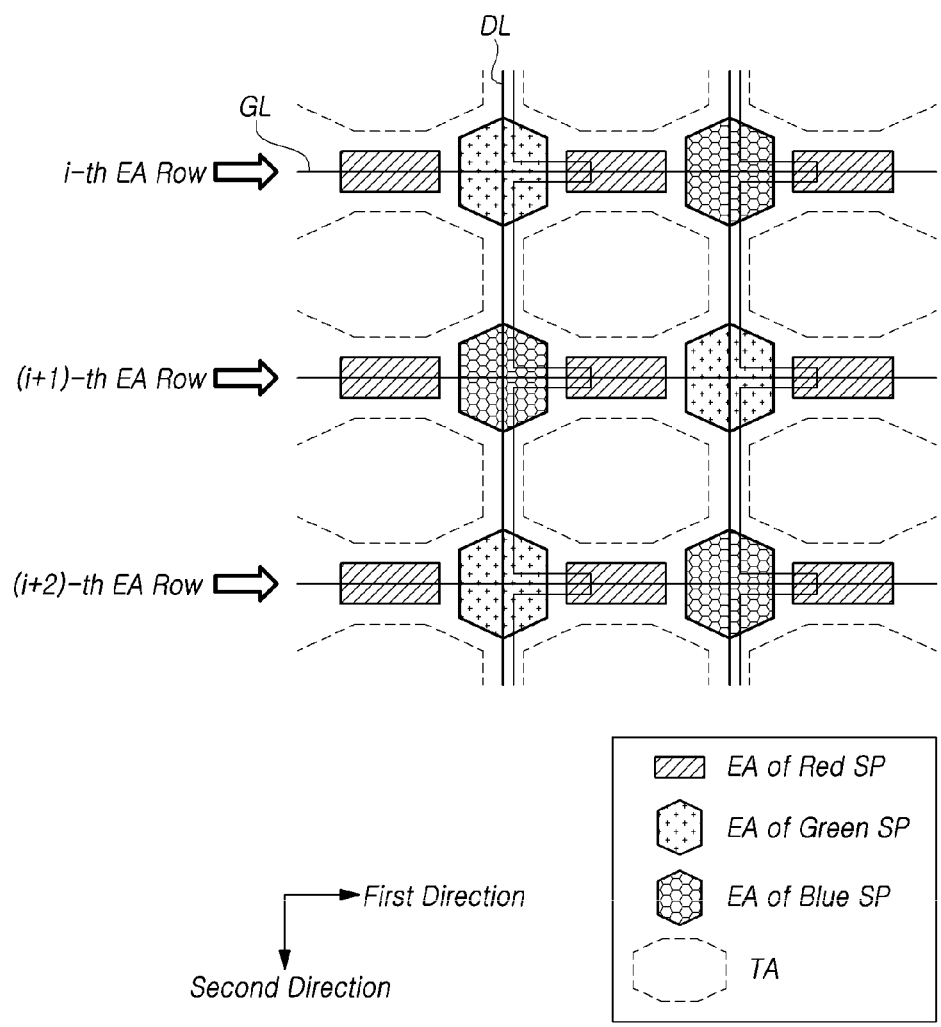
FIGS. 2 to 4 are diagrams illustrating arrangements of light emitting areas and transmissive areas in the transparent touch display device according to embodiments of the present disclosure.
Figure 3:
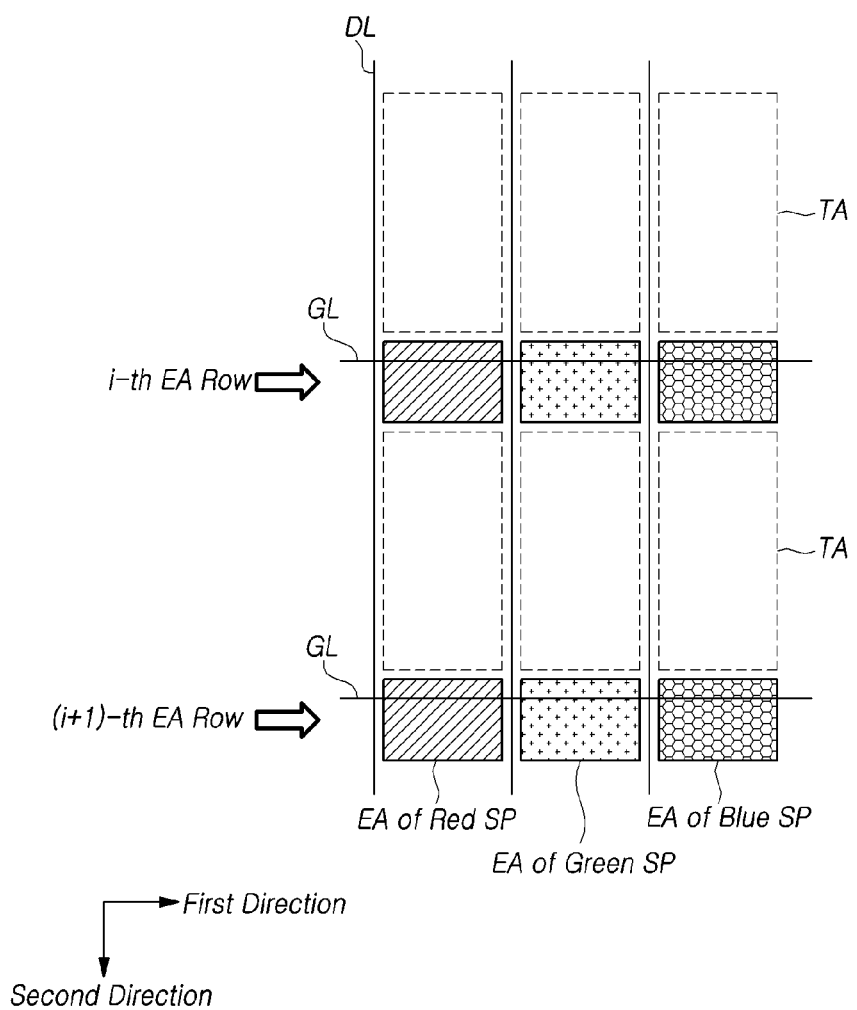
Figure 4:
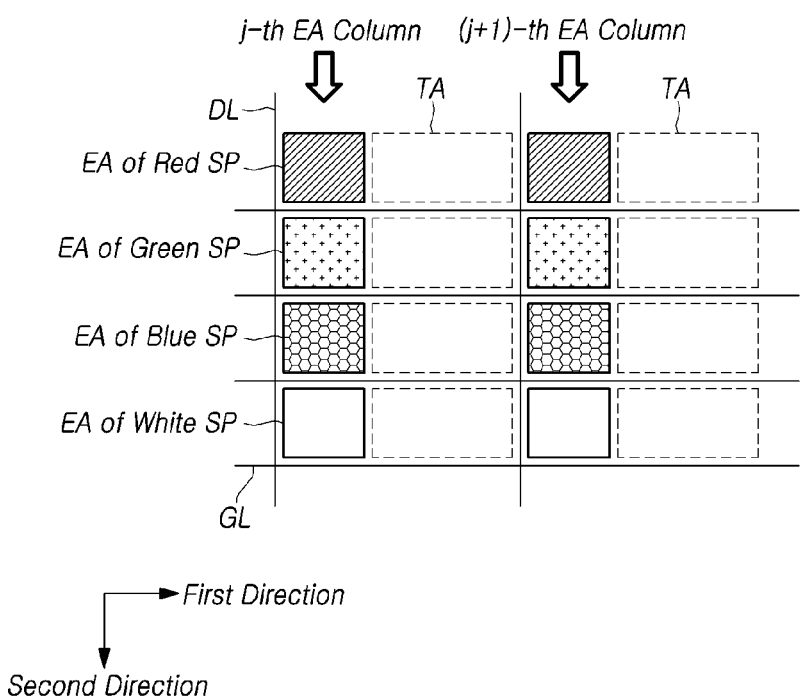

FIGS. 2 to 4 are diagrams illustrating arrangements of light emitting areas EA and transmissive areas TA in the transparent touch display device 100 according to embodiments of the present disclosure. Referring to FIGS. 2 and 3, the subpixels SP of the transparent touch display device 100 may include a first color subpixel emitting a first color light, a second color subpixel emitting a second color light, and a third color subpixel emitting a third color light. For example, each of the first color, the second color, and the third color may be one of red, green, and blue.

Referring to FIG. 4, the subpixels SP of the transparent touch display device 100 may include a first color subpixel emitting a first color light, a second color subpixel emitting a second color light, a third color subpixel emitting a third color light, and a fourth color subpixel emitting a fourth color light. For example, each of the first color, the second color, the third color, and the fourth color may be one of red, green, blue, and white.

Referring to FIGS. 2 to 4, the display panel 110 of the transparent touch display device 100 may include light emitting areas EA of subpixels SP and transmissive areas TA adjacent to the light emitting areas EA.

The light emitting area EA of the subpixel SP may correspond to an area in which the pixel electrode of the subpixel SP is disposed. The light emitting area EA of the subpixel SP may correspond to an area where the pixel electrode, the light emitting layer, and the common electrode constituting the light emitting device (e.g., OLED) of the subpixel SP overlap.

Based on the light emitting characteristics of the light emitting device for each color, the area of the light emitting area EA for each color may be variously designed.

Referring to FIG. 3, the area of the light emitting area EA of the first color subpixel (e.g., Red SP), the area of the light emitting area EA of the second color subpixel (e.g., Green SP), and the area of the light emitting area EA of the third color subpixel (e.g., Blue SP) may be the same or may be similar within a predetermined range.

Referring to FIG. 2, the area of the light emitting area EA of the second color subpixel (e.g., Green SP) and the area of the light emitting area EA of the third color subpixel (e.g., Blue SP) may be the same or similar within a predetermined range. The area of each of the light emitting area EA of the second color subpixel (e.g., Green SP) and the light emitting area EA of the third color subpixel (e.g., Blue SP) may be larger than the area of the light emitting area EA of the first color subpixel (e.g., Red SP) by a predetermined value.

Referring to FIG. 4, the area of the light emitting area EA of the first color subpixel (e.g., Red SP), the area of the light emitting area EA of the second color subpixel (e.g., Green SP), the area of the light emitting area EA of the third color subpixel (e.g., Blue SP), and the area of the light emitting area EA of the fourth color subpixel (e.g., White SP) may be the same or may be similar within a predetermined range.

Based on the desired transmittance and the area of each light emitting area EA, the area of each transmissive area TA may be determined.

As the ratio of the areas of the transmissive areas TA to the areas of the light emitting areas EA increases, the transmittance of the display panel 110 may increase. As the ratio of the areas of the transmissive areas TA to the areas of the light emitting areas EA decreases, the transmittance of the display panel 110 may decrease. The transmittance and the transmissive area TA described in the present specification may be referred to as transparency and the transparent area.

Each of the transmissive areas TA included in the display panel 110 may have the same area. Alternatively, an area of one of the transmissive areas TA included in the display panel 110 may be different from an area of the other transmissive area TA.

The light emitting areas EA and the transmissive areas TA may be arranged in various forms.

Referring to FIG. 2, in the i-th light-emitting area row (i-th EA Row), the light emitting areas EA of the first color subpixels (e.g., Red SP) are arranged apart from each other in the first direction (e.g., row direction), and the light emitting areas EA of the second color subpixels (e.g., Green SP) and the light emitting areas EA of the third color subpixels (e.g., Blue SP) may be alternately disposed between the light emitting areas EA of the first color subpixels (e.g., Red SP). In the (i+1)-th light emitting area row ((i+1)-th EA Row) adjacent to the i-th light emitting area row (i-th EA Row) in the second direction (e.g., column direction), the light emitting areas EA of the first color subpixels (e.g., Red SP) are arranged apart from each other in the first direction, and the light emitting areas EA of the third color subpixel (e.g., Blue SP) and the light emitting areas EA of the second color subpixel (e.g., Green SP) may be alternately disposed between the light emitting areas EA of the first color subpixels (e.g., Red SP). And, in the (i+2)-th light emitting area row ((i+2)-th EA Row) adjacent to the (i+1)-th light emitting area row ((i+1)-th EA Row) in the second direction (e.g., column direction), the light emitting areas EA of the first color subpixels (e.g., Red SP) are arranged apart from each other in the first direction, and the light emitting areas EA of the second color subpixels (e.g., Green SP) and the light emitting areas EA of the third color subpixels (e.g., Blue SP) may be alternately disposed between the light emitting areas EA of the first color subpixels (e.g., Red SP).

Referring to FIG. 2, transmissive areas TA may be disposed between light emitting area rows (i-th EA Row, (i+1)-th EA Row, (i+2)-th EA Row) disposed adjacent to each other in the second direction. For example, the transmissive areas TA may be disposed between the i-th light emitting area row (i-th EA Row) and the (i+1)-th light emitting area row ((i+1)-th EA Row). The transmissive areas TA may be disposed between the (i+1)-th light emitting area row ((i+1)-th EA Row) and the (i+2)-th light emitting area row ((i+2)-th EA Row).

Referring to FIG. 2, the transmissive area TA between the light emitting areas EA of the first color subpixels (e.g., Red SP) disposed adjacent in the second direction (e.g., column direction) may be extended to the area between the light emitting area EA of the second color pixel (e.g., Green SP) and the light emitting area EA of the third color pixel (e.g., Blue SP) disposed adjacent in the second direction (e.g., column direction).

Referring to FIG. 2, each of the data lines DL may be disposed while extending in a second direction (e.g., column direction). Each of the data lines DL may be disposed while avoiding the transmissive areas TA. Each of the gate lines GL may be disposed to extend in a first direction (e.g., row direction). The gate lines GL may be disposed to overlap the i-th light emitting area row (i-th EA Row), the (i+1)-th light emitting area row ((i+1)-th EA Row), and the (i+2)-th light emitting area row ((i+2)-th EA Row). The gate lines GL may be disposed while avoiding the transmissive areas TA.

Referring to FIG. 3, in each of the light emitting area rows (i-th EA Row, (i+1)-th EA Row), the light emitting area EA of the first color subpixel (e.g., Red SP), the light emitting area EA of the second color subpixel (e.g., Green SP), and the light emitting areas EA of the three-color subpixel (e.g., Blue SP) may be arranged adjacent to each other in a first direction (e.g., row direction).

Referring to FIG. 3, the transmissive areas TA are disposed between adjacent light emitting area rows (i-th EA Row, (i+1)-th EA Row) in the second direction (e.g., column direction).

Referring to FIG. 3, each of the data lines DL may be disposed while extending in the second direction. Each of the data lines DL may be disposed while avoiding the transmissive areas TA. Each of the gate lines GL may be disposed while extending in the first direction. The gate lines GL may be disposed to overlap each light emitting area row (i-th EA Row, (i+1)-th EA Row). The gate lines GL may be disposed while avoiding the transmissive areas TA.

Referring to FIG. 4, in each of the light emitting area columns (j-th EA Column, (j+1)-th EA Column), the light emitting area EA of the first color subpixel (e.g., Red SP), the light emitting area EA of the second color subpixel (e.g., Green SP), the light emitting area EA of the third color subpixel (e.g., Blue SP), and the light emitting area EA of the fourth color subpixel (e.g., White SP) may be arranged adjacent to each other in the second direction (e.g., column direction).

Referring to FIG. 4, the transmissive areas TA may be disposed between adjacent light emitting area columns (j-th EA Column, (j+1)-th EA Column) in the first direction.

Referring to FIG. 4, each of the data lines DL may be disposed while extending in the second direction. Each of the data lines DL may be disposed while avoiding the transmissive areas TA. Each of the gate lines GL may be disposed while extending in the first direction. The gate lines GL may be disposed between the light emitting area rows. The gate lines GL may be disposed between the transmissive areas TA while avoiding the transmissive areas TA.

Figure 5:
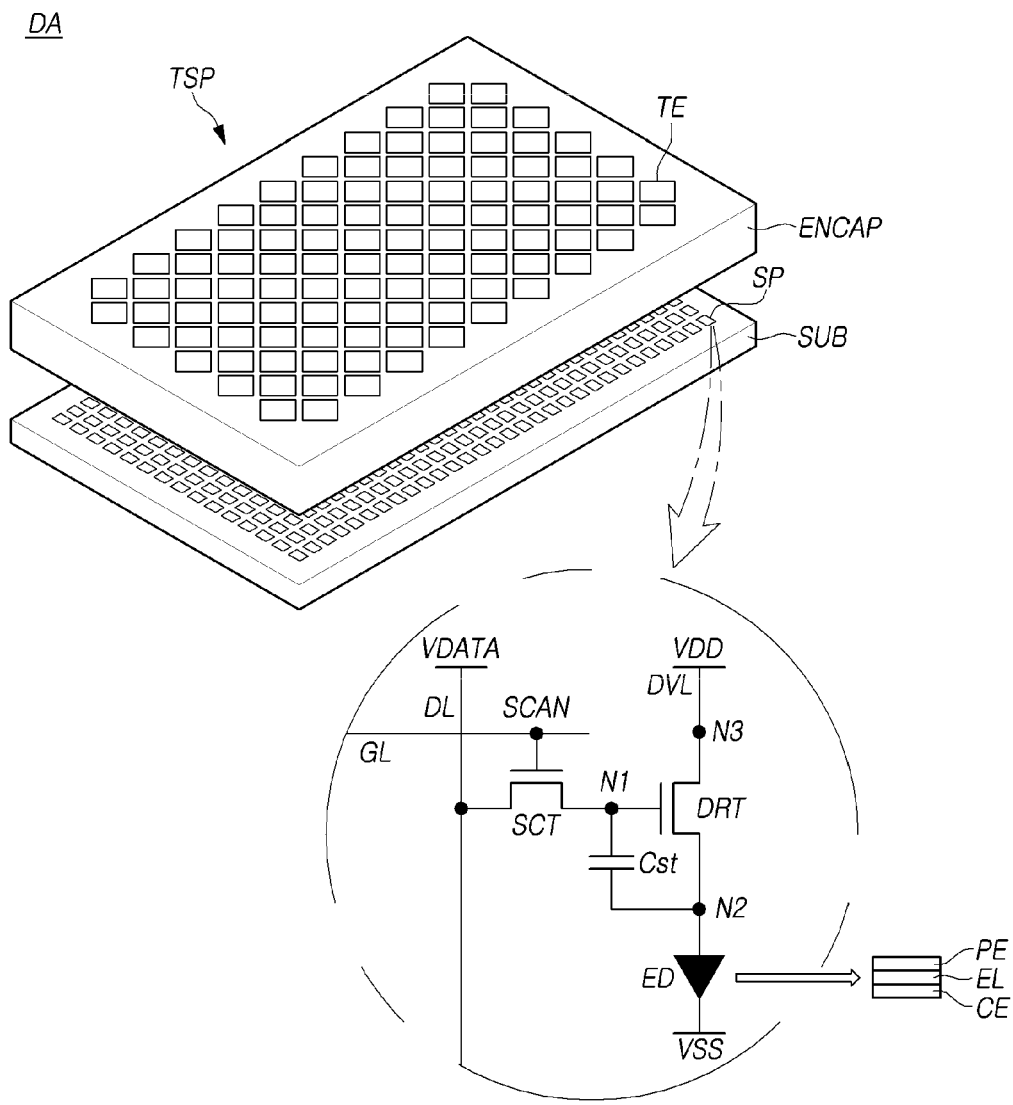
FIG. 5 is a diagram illustrating a schematic structure of a display panel of the transparent touch display device according to embodiments of the present disclosure.

FIG. 5 is a diagram illustrating a schematic structure of the display panel 110 of the transparent touch display device 100 according to embodiments of the present disclosure. Referring to FIG. 5, the display panel 110 of the transparent touch display device 100 may include a touch panel TSP. That is, in the transparent touch display device 100, the touch panel TSP may be an embedded type built into the display panel 110. The built-in touch panel (TSP) may be also referred to as an in-cell type or an on-cell type touch panel.

Each sub-pixel SP in the display area DA of the display panel 110 may include a light emitting device ED, a driving transistor DRT for driving the light emitting device ED, a scan transistor SCT for transmitting a data voltage VDATA to a first node N1 of the driving transistor DRT, and a storage capacitor Cst for maintaining a predetermined voltage for one frame.

The driving transistor DRT includes a first node N1 to which a data voltage VDATA can be applied, a second node N2 electrically connected to the light emitting device ED, and a third node N3 to which a driving voltage VDD is applied from the driving voltage line DVL. The first node N1 may be a gate node, the second node N2 may be a source node or a drain node, and the third node N3 may be a drain node or a source node.

The light emitting device ED may include a pixel electrode PE, a light emitting layer EL, and a common electrode CE. The pixel electrode PE may be disposed in each subpixel SP and may be electrically connected to the second node N2 of the driving transistor DRT of each subpixel SP. The common electrode CE may be commonly disposed in a plurality of subpixels SP. A base voltage VSS may be applied to the common electrode CE. For example, the light emitting device ED may be an organic light emitting diode (OLED). In this case, the light emitting layer EL in the light emitting device ED may include an organic light emitting layer containing an organic material.

The scan transistor SCT may be controlled on-off by the scan signal SCAN, which is a gate signal applied through the gate line GL, and may be electrically connected between the first node N1 of the driving transistor DRT and the data line DL.

The storage capacitor Cst may be electrically connected between the first node N1 of the driving transistor DRT and the second node N2 of the driving transistor DRT.

Each subpixel SP may have a 2T1C structure including two transistors DRT and SCT and one capacitor Cst, as shown in FIG. 5. Each subpixel SP may further include one or more transistors and/or one or more capacitors.

The storage capacitor Cst may not be a parasitic capacitor (e.g., Cgs, Cgd), which is an internal capacitor that may exist between the first node N1 and the second node N2 of the driving transistor DRT, but may be an external capacitor intentionally designed outside the driving transistor DRT.

Each of the driving transistor DRT and the scan transistor SCT may be an n-type transistor or a p-type transistor.

Since circuit elements (especially, light-emitting device ED) in each subpixel SP are vulnerable to external moisture or oxygen, an encapsulation layer ENCAP for preventing penetration of external moisture or oxygen into the circuit elements (especially, light-emitting device ED) may be disposed on the display panel 110. For example, the encapsulation layer ENCAP may be disposed on the common electrode CE of the light-emitting devices ED.

Meanwhile, in the transparent touch display device 100, the touch panel TSP may be formed on the encapsulation layer ENCAP. In other words, in the transparent touch display device 100, a touch sensor structure such as a plurality of touch electrodes TE constituting the touch panel TSP may be disposed on the encapsulation layer ENCAP. Here, an encapsulation layer ENCAP may be disposed between the touch electrodes TE and the common electrode CE.

During touch sensing, a touch driving signal or a touch sensing signal may be applied to one or more touch electrodes TE. Accordingly, during touch sensing, a potential difference may be formed between the touch electrodes TE and the common electrode CE, so that unnecessary parasitic capacitance may be formed. Parasitic capacitance can degrade touch sensitivity.

In order to lower the parasitic capacitance, the distance between the touch electrode TE and the common electrode CE may be designed to be greater than or equal to a predetermined value (e.g., 5 μm) in consideration of a panel thickness, a panel manufacturing process, and display performance. Accordingly, in some embodiments, for example, the thickness of the encapsulation layer ENCAP may be designed to be at least 5 μm.

Figure 6:
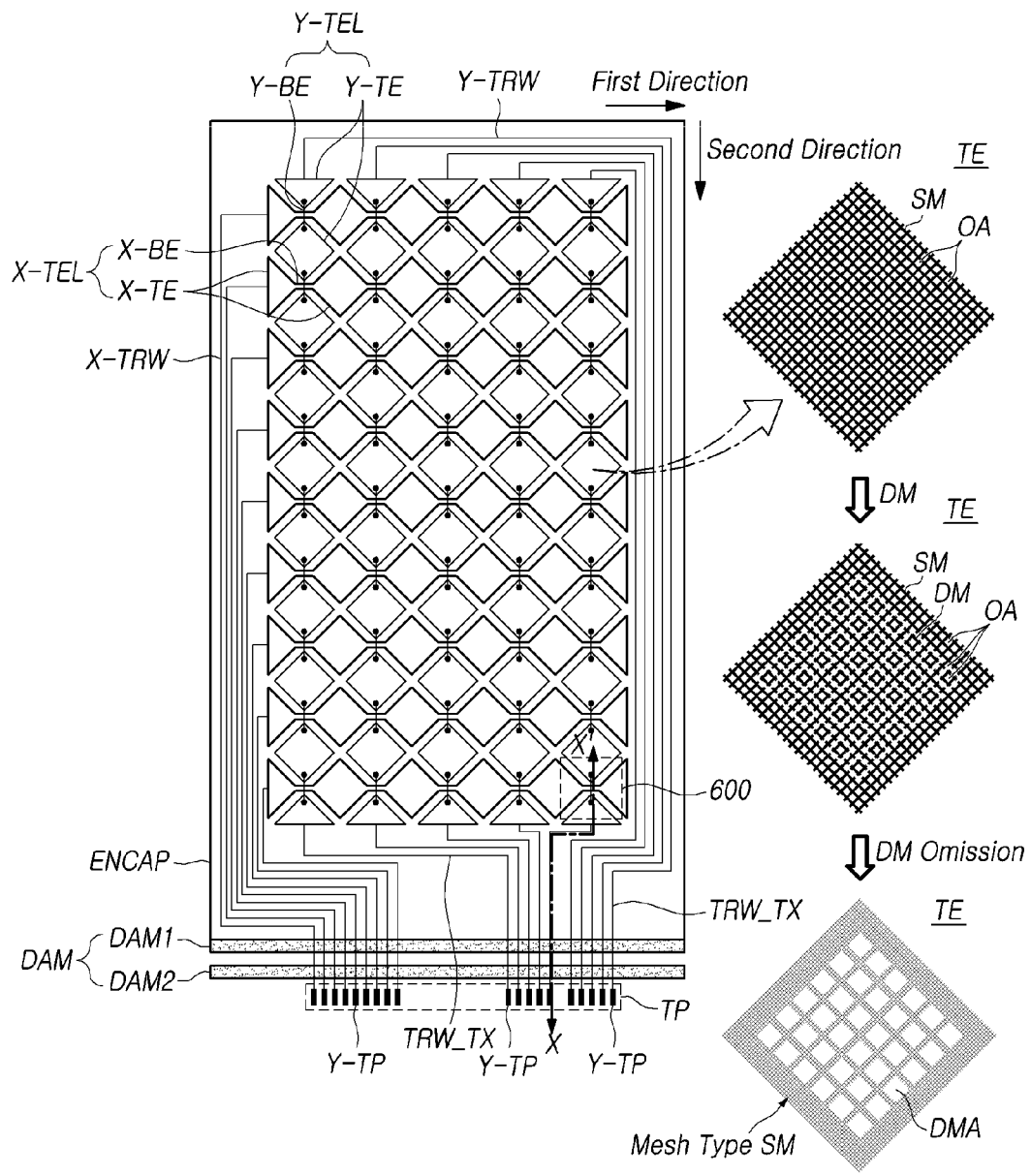
FIGS. 6 and 7 are a top plan view and a sectional view of the display panel of the transparent touch display device according to embodiments of the present disclosure.

FIG. 6 is a top plan view of the display panel 110 of the transparent touch display device 100 according to embodiments of the present disclosure. Referring to FIG. 6, when the transparent touch display device 100 performs mutual capacitance-based touch sensing, the touch sensor structure of the transparent touch display device 100 may include a plurality of first touch electrode lines (hereinafter referred to as X-touch electrode line) and a plurality of second touch electrode lines (hereinafter referred to as Y-touch electrode line).

A plurality of X-touch electrode lines X-TEL and a plurality of Y-touch electrode lines Y-TEL are located on the encapsulation layer ENCAP. Each of the plurality of X-touch electrode lines X-TEL may be disposed in a first direction (e.g., row direction), and each of the plurality of Y-touch electrode lines Y-TEL may be disposed in a second direction (e.g., column direction) different from the first direction. In the present specification, the first direction and the second direction may be relatively different directions. For example, a first direction may be an x-axis direction (e.g., row direction) and a second direction may be a y-axis direction (e.g., column direction). Conversely, the first direction may be the y-axis direction and the second direction may be the x-axis direction. Further, the first direction and the second direction may be orthogonal to each other, but may not be orthogonal to each other. In addition, in the present specification, rows and columns are relative, and rows and columns may be changed according to a viewing point of view. Also, the first direction may be a direction parallel to a direction in which the gate line GL is disposed, and the second direction may be a direction parallel to a direction in which the data line DL is disposed.

Each of the plurality of X-touch electrode lines X-TEL may be composed of a plurality of X-touch electrodes X-TE that are electrically connected. Each of the plurality of Y-touch electrode lines Y-TEL may include a plurality of Y-touch electrodes Y-TE that are electrically connected.

The roles of the plurality of X-touch electrode lines X-TEL and the plurality of Y-touch electrode lines Y-TEL may be different from each other.

The plurality of X-touch electrode lines X-TEL may be the driving touch electrode lines driven by the touch driving circuit 160. The plurality of X-touch electrode lines X-TEL may be applied with touch driving signals output from the touch driving circuit 160. The plurality of Y-touch electrode lines Y-TEL may be the sensing touch electrode lines sensed by the touch driving circuit 160.

In this case, the plurality of X-touch electrodes X-TE constituting each of the plurality of X-touch electrode lines X-TEL are the driving touch electrodes, and the plurality of Y-touch electrodes Y-TE constituting each of the plurality of Y-touch electrode lines Y-TEL may be the sensing touch electrodes.

Conversely, the plurality of X-touch electrode lines X-TEL may be the sensing touch electrode lines sensed by the touch driving circuit 160. The plurality of Y-touch electrode lines Y-TEL may be the driving touch electrode lines driven by the touch driving circuit 160. The plurality of Y-touch electrode lines Y-TEL may be applied with touch driving signals output from the touch driving circuit 160.

In this case, the plurality of X-touch electrodes X-TE constituting each of the plurality of X-touch electrode lines X-TEL are the sensing touch electrodes, and the plurality of Y-touch electrodes Y-TE constituting each of the plurality of Y-touch electrode lines Y-TEL may be the driving touch electrodes.

The touch sensor metal for touch sensing may include a plurality of touch routing wirings (X-TRW, Y-TRW) in addition to the plurality of X-touch electrode lines X-TEL and the plurality of Y-touch electrode lines Y-TEL. The plurality of touch routing wirings (X-TRW, Y-TRW) include one or more X-touch routing wirings X-TRW connected to each of the plurality of X-touch electrode lines X-TEL, and one or more Y-touch routing wirings Y-TRW connected to each of the plurality of Y-touch electrode lines Y-TEL.

Referring to FIG. 6, each of the plurality of X-touch electrode lines X-TEL may include the plurality of X-touch electrodes X-TE disposed in the same row (or same column) and electrically connected to each other, and X-bridge electrodes X-BE electrically connecting adjacent X-touch electrodes X-TE to each other in a first direction (e.g., row direction).

As shown in FIG. 6, the X-bridge electrode X-BE connecting two adjacent X-touch electrodes X-TE may be a metal integrated with two adjacent X-touch electrodes X-TE. In contrast, the X-bridge electrode X-BE connecting two adjacent X-touch electrodes X-TE may be located on a different layer from the adjacent two X-touch electrodes X-TE and may be electrically connected to two X-touch electrodes X-TE through contact holes.

Referring to FIG. 6, each of the plurality of Y-touch electrode lines Y-TEL may include the plurality of Y-touch electrodes Y-TE disposed in the same column (or same row) and electrically connected, and Y-bridge electrodes Y-BE electrically connecting two Y-touch electrodes Y-TE adjacent to each other in a second direction (e.g., column direction).

As shown in FIG. 6, the Y-bridge electrode Y-BE connecting two adjacent Y-touch electrodes Y-TE may be located on a different layer from the adjacent two Y-touch electrodes Y-TE and may be electrically connected to two adjacent Y-touch electrodes Y-TE through contact holes. In contrast, the Y-bridge electrode Y-BE connecting two adjacent Y-touch electrodes Y-TE may be a metal integrated with two adjacent Y-touch electrodes Y-TE.

In a region (touch electrode line crossing area) where the X-touch electrode line X-TEL and the Y-touch electrode line Y-TEL cross each other, the X-bridge electrode X-BE and the Y-bridge electrode Y-BE may cross. In the touch electrode line crossing area, when the X-bridge electrode X-BE and the Y-bridge electrode Y-BE cross each other, the X-bridge electrode X-BE and the Y-bridge electrode Y-BE must be located in different layers.

Therefore, in order to be arranged so that the plurality of X-touch electrode lines X-TEL and the plurality of Y-touch electrode lines Y-TEL cross, the plurality of X-touch electrodes X-TE, the plurality of X-bridge electrode X-BE, the plurality of Y-touch electrodes Y-TE, the plurality of Y-touch electrode lines Y-TEL, and the plurality of Y-bridge electrodes Y-BE may be located in more than one layer.

Referring to FIG. 6, each of the plurality of X-touch electrode lines X-TEL may be electrically connected to the corresponding X-touch pad X-TP in the touch pad unit TP through one or more X-touch routing wirings X-TRW. Each of the plurality of Y-touch electrode lines Y-TEL may be electrically connected to a corresponding Y-touch pad Y-TP in the touch pad unit TP through one or more Y-touch routing wirings Y-TRW.

Meanwhile, as shown in FIG. 6, the plurality of X-touch electrodes X-TE and the plurality of X-bridge electrodes X-BE may be disposed on the encapsulation layer ENCAP positioned on the common electrode CE. The plurality of X-touch electrodes X-TE and the plurality of X-bridge electrodes X-BE constitute the plurality of X-touch electrode lines X-TEL. The plurality of Y-touch electrodes Y-TE and the plurality of Y-bridge electrodes Y-BE may be disposed on the encapsulation layer ENCAP. The plurality of Y-touch electrodes Y-TE and the plurality of Y-bridge electrodes Y-BE constitute the plurality of Y-touch electrode lines Y-TEL.

On the other hand, as shown in FIG. 6, each of the plurality of X-touch routing wirings X-TRW electrically connected to the plurality of X-touch electrode lines X-TEL is disposed on the encapsulation layer ENCAP and extends to a place where there is no encapsulation layer ENCAP to be electrically connected to the plurality of X-touch pads X-TP. Each of the plurality of Y-touch routing wirings Y-TRW electrically connected to the plurality of Y-touch electrode lines Y-TEL is disposed on the encapsulation layer ENCAP and extends to a place where there is no encapsulation layer ENCAP to be electrically connected to the plurality of Y-touch pads Y-TP. The encapsulation layer ENCAP may be located in the display area DA, and in some cases, may extend to the non-display area NDA.

Meanwhile, as described above, in order to prevent any layer (e.g., encapsulation layer) in the display area DA from collapsing, a dam unit DAM may exist in the boundary area between the display area DA and the non-display area NDA or in the non-display area NDA that is an outer area of the display area NA.

The dam unit DAM may include one or more dams. For example, as shown in FIG. 6, the dam unit DAM may include a primary dam DAM1 and a secondary dam DAM2. The secondary dam DAM2 may be a dam located further outside the primary dam DAM1. Unlike the example of FIG. 6, in some embodiments, the dam unit DAM may include only the primary dam DAM1. Alternatively, in other embodiments, the dam unit DAM may further include at least one additional dam as well as the primary dam DAM1 and the secondary dam DAM2.

Meanwhile, referring to FIG. 6, the encapsulation layer ENCAP may be located on the inner side of the dam unit DAM. Alternatively, the encapsulation layer ENCAP may be located on the inner side of the dam unit DAM, and may be located extending to the upper and/or lower part of the dam unit DAM. The encapsulation layer ENCAP may be further extended to be located on the outer side of the dam unit DAM.

In the display panel 110 of the transparent touch display device 100, each touch electrode TE may be a plate-shaped electrode metal without an opening. In this case, each touch electrode TE may be a transparent electrode. That is, each touch electrode TE may be made of a transparent electrode material so that light emitted from the plurality of subpixels SP disposed below can be transmitted upward.

Alternatively, as illustrated in FIG. 6, each touch electrode TE disposed on the display panel 110 may be of a mesh type. Accordingly, in some embodiments, each touch electrode TE may be formed of a sensor metal SM in which a plurality of openings OA is formed by patterning in a mesh type. The sensor metal SM of each touch electrode TE is a part corresponding to the actual touch electrode TE, and may be a part to which a touch driving signal is applied or a part in which a touch sensing signal is sensed. The sensor metal SM corresponding to each touch electrode TE may be located on a bank disposed in a region other than the emission regions EA of the subpixels SP.

As shown in FIG. 6, when each of the touch electrodes TE is a sensor metal SM patterned in a mesh type, a plurality of openings OA may exist in a region in which the touch electrode TE is formed. Each of the plurality of openings OA present in each touch electrode TE may correspond to the light emitting area EA of the one or more subpixels SP or may correspond to the one or more transmissive areas TA. That is, the plurality of openings OA may be a path through which light emitted from a plurality of subpixels SP disposed below pass upward to form a light emitting area EA, or may be a path through which light is transmitted to form a transmissive area TA.

For example, the shape of the outline of the touch electrode TE may be a square shape such as a diamond shape or a rhombus, or various shapes such as a triangle, a pentagon, or a hexagon. Each of the plurality of openings OA may have various shapes according to the shape of the touch electrode TE or the mesh shape of the sensor metal SM.

Referring to FIG. 6, in an area of each touch electrode TE, a mesh-type sensor metal SM and one or more dummy metals DM may exist. The dummy metal DM may be located in the area of the touch electrode TE and at least partially surrounded by the sensor metal SM. Unlike the sensor metal SM, the dummy metal DM is a portion in which a touch driving signal is not applied and a touch sensing signal is not detected, and may be a floating metal. The sensor metal SM may be electrically connected to the touch driving circuit 160, but the dummy metal DM is not electrically connected to the touch driving circuit 160.

In each area of all the touch electrodes TE, one or more dummy metals DM may exist in a state disconnected from the sensor metal SM. In contrast, one or more dummy metals DM may exist only in an area of some of the touch electrodes TE among all the touch electrodes TE, and the dummy metal DM may not exist in the area of other touch electrodes TE.

Meanwhile, in relation to the role of the dummy metal DM, when one or more dummy metals DM do not exist in the area of the touch electrode TE and only the sensor metal SM exists in a mesh type, an outlines of the sensor metal SM may be seen on the screen. This is called the visibility issue. In contrast, as illustrated in FIG. 6, when one or more dummy metals DM exist in the area of the touch electrode TE, a visibility issue in which the outlines of the sensor metal are visible on the screen can be prevented.

In addition, by controlling the presence or absence or number of dummy metals DM or the dummy metal ratio for each touch electrode, the capacitance for each touch electrode TE may be adjusted to improve touch sensitivity.

Meanwhile, by cutting (etching) some points in the sensor metal SM formed in the region of one touch electrode TE, the sensor metals SM that are cut and exist in the form of an island may be formed as the dummy metals DM. That is, the sensor metals SM and the dummy metal DM may be the same material formed on the same layer.

Referring to FIG. 6, if a plurality of dummy metals DM existing in an area of one touch electrode TE are omitted and only the sensor metal SM is shown, a plurality of dummy areas DM may exist in the area in which the sensor metal SM is disposed. The plurality of dummy areas DMA is an area corresponding to the plurality of dummy metals DM.

Figure 7:
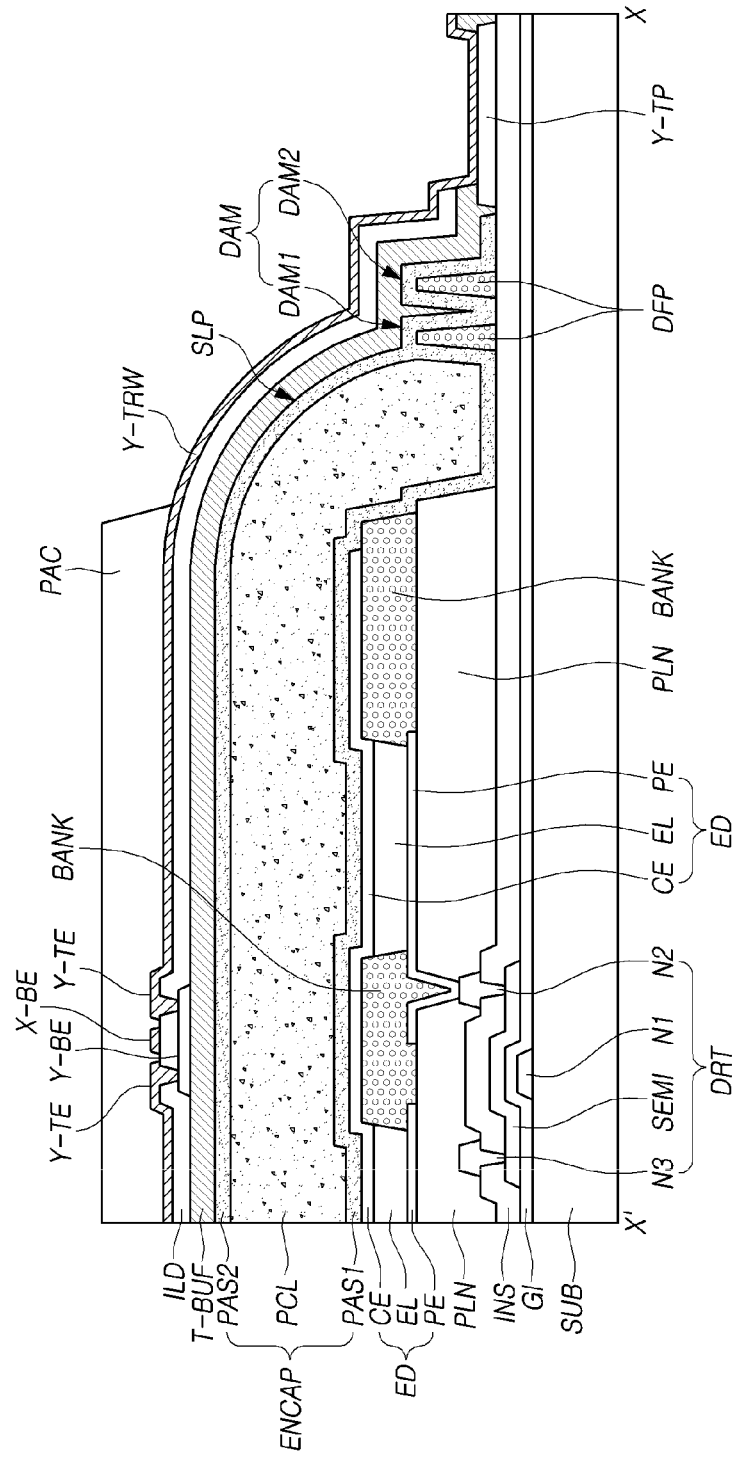

FIG. 7 is a sectional view of the display panel 110 of the transparent touch display device 100 according to embodiments of the present disclosure. FIG. 7 is the sectional view taken along line X-X' of FIG. 6. However, in FIG. 7, as will be described later, the touch electrode Y-TE is not formed in a mesh type, but is assumed to be formed in a plate shape for convenience of explanation.

In each subpixel SP in the display area DA, the driving transistor DRT is disposed on the substrate SUB. The driving transistor DRT may include a first node N1 corresponding to a gate electrode, a second node N2 corresponding to a source electrode or a drain electrode, a third node N3 corresponding to a drain electrode or a source electrode, and a semiconductor layer SEMI.

In the driving transistor DRT, a gate insulating layer GI is disposed between the first node N1 and the semiconductor layer SEMI, and the first node N1 and the semiconductor layer SEMI may overlap. In the driving transistor DRT, the second node N2 may be formed on the insulating layer INS to contact one side of the semiconductor layer SEMI, and the third node N3 may be formed on the insulating layer INS to contact the other side of the semiconductor layer SEMI.

The light emitting device ED may include a pixel electrode PE corresponding to an anode electrode, an light emitting layer EL formed on the pixel electrode PE, and a common electrode CE corresponding to a cathode electrode formed on the light emitting layer EL.

The pixel electrode PE may be electrically connected to the second node N2 of the driving transistor DRT exposed through a contact hole penetrating the planarization layer PLN.

The light emitting layer EL may be formed on the pixel electrode PE of the light emitting area EA provided by the bank. The common electrode CE may be formed to face the pixel electrode PE with the light emitting layer EL interposed therebetween.

The encapsulation layer ENCAP may block the penetration of external moisture or oxygen into the light emitting device ED, which is vulnerable to external moisture or oxygen. The encapsulation layer ENCAP may be formed of a single layer, but may be formed of a plurality of layers PAS1, PCL, and PAS2 as shown in FIG. 7.

For example, when the encapsulation layer ENCAP is made of a plurality of layers (PAS1, PCL, PAS2), the encapsulation layer ENCAP may include one or more inorganic encapsulation layers PAS1 and PAS2 and one or more organic encapsulation layers PCL. As a specific example, the encapsulation layer ENCAP may be formed by sequentially stacking the first inorganic encapsulation layer PAS1, the organic encapsulation layer PCL, and the second inorganic encapsulation layer PAS2.

The first inorganic encapsulation layer PAS1 may be formed on the substrate SUB on which the common electrode CE is formed. Among the first inorganic encapsulation layer PAS1, the organic encapsulation layer PCL, and the second inorganic encapsulation layer PAS2, the first inorganic encapsulation layer PAS1 is disposed closest to the first light emitting device ED. For example, the first inorganic encapsulation layer PAS1 may be formed of an inorganic insulating material capable of low-temperature deposition such as silicon nitride ($SiN_x$), silicon oxide ($SiO_x$), silicon oxynitride (SiON), or aluminum oxide ($Al_2O_3$). The first inorganic encapsulation layer PAS1 may prevent damage to the light emitting layer EL including an organic material vulnerable to a high temperature atmosphere during the deposition process.

The organic encapsulation layer PCL may be formed to have a smaller area than the first inorganic encapsulation layer PAS1. The organic encapsulation layer PCL may be formed to expose both ends of the first inorganic encapsulation layer PAS1. The organic encapsulation layer PCL serves as a buffer to relieve stress between layers due to bending of the transparent touch display device 100, which may be an organic light emitting display device, and may serve to enhance planarization performance. For example, the organic encapsulation layer (PCL) may be formed of an organic insulating material such as acrylic resin, epoxy resin, polyimide, polyethylene, or silicon oxycarbon (SiOC).

Referring to FIG. 7, the dam unit DAM may include a primary dam DAM1 closer to the display area DA and a secondary dam DAM2 closer to the touch pad unit TP disposed in the non-display area NDA. For example, the dam unit DAM may be positioned between the touch pad unit TP and the display area DA. The touch pad unit TP may include a plurality of X-touch pads (X-TP) and a plurality of Y-touch pads (Y-TP).

When there is no dam unit DAM, when the liquid organic encapsulation layer PCL is dropped onto the display area DA during the panel manufacturing process, the liquid organic encapsulation layer PCL may collapse in the direction of the non-display area NDA and invade the pad area in which the touch pad unit TP is formed. One or more dams included in the dam unit DAM may prevent the liquid organic encapsulation layer PCL from collapsing. This effect may be further increased when the dam unit DAM includes a plurality of dams DAM1 and DAM2, as shown in FIG. 7.

Each of the primary dam DAM1 and the secondary dam DAM2 included in the dam unit DAM may be formed in a single-layer or multi-layer structure. Each of the primary dams DAM1 and the secondary dams DAM2 may be basically made of a dam formation pattern DFP.

The dam formation pattern DFP may be formed of the same material as the bank for separating the subpixels SP from each other, or may be formed of the same material as a spacer for maintaining an interlayer gap. The dam formation pattern DFP may be formed at the same time as a bank or a spacer, and thus, a dam structure may be formed without a mask addition process and cost increase.

In addition, as shown in FIG. 7, the first dam DAM1 and/or the second dam DAM2 may have a structure in which a first inorganic encapsulation layer PAS1 and/or a second inorganic encapsulation layer PAS2 are stacked on the dam formation pattern DFP.

In some embodiments, the organic encapsulation layer PCL containing an organic material may be located only on the inner side of the primary dam DAM1. Alternatively, in other embodiments, the organic encapsulation layer PCL may be located on at least the primary dam DAM1 among the primary dam DAM1 and the secondary dam DAM2.

The first and second inorganic encapsulation layers PAS1 and PAS2 may also be located on at least the primary dam DAM1 among the primary dam DAM1 and the secondary dam DAM2. The first and second inorganic encapsulation layers PAS1 and PAS2 may be located on the outer side of at least the primary dam DAM1 among the primary dam DAM1 and the secondary dam DAM2.

The second inorganic encapsulation layer PAS2 may be formed to at least partially cover or overlay upper and side surfaces of the organic encapsulation layer PCL and the first inorganic encapsulation layer PAS1 on the substrate SUB on which the organic encapsulation layer PCL is formed. The second inorganic encapsulation layer PAS2 reduces or blocks the penetration of external moisture or oxygen into the first inorganic encapsulation layer PAS1 and the organic encapsulation layer PCL.

A touch buffer layer T-BUF may be disposed on the encapsulation layer ENCAP. The touch buffer layer T-BUF may be positioned between the touch sensor metal and the common electrode CE of the light emitting device ED. The touch buffer layer T-BUF may not exist between the touch sensor metal and the common electrode CE of the light emitting device ED.

The touch buffer layer T-BUF may be designed to maintain a predetermined minimum separation distance (e.g., 5 µm) between the touch sensor metal and the common electrode CE of the light emitting device ED. Accordingly, it is possible to reduce or prevent parasitic capacitance formed between the touch sensor metal and the common electrode CE of the light emitting device ED, thereby preventing a decrease in touch sensitivity due to the parasitic capacitance. In addition, the touch buffer layer T-BUF may block a chemical solution (a developer or an etchant, etc.) used in the manufacturing process of the touch sensor metal disposed on the touch buffer layer T-BUF or moisture from outside from penetrating into the light emitting layer EL including an organic material.

The touch buffer layer T-BUF may be formed at a low temperature below a certain temperature (e.g., 100° C.) in order to prevent damage to the light emitting layer EL including an organic material that is vulnerable to high temperatures. The touch buffer layer T-BUF may be formed of an organic insulating material having a low dielectric constant of 1 to 3. For example, the touch buffer layer T-BUF may be formed of an acrylic-based, epoxy-based, or siloxane-based material. The touch buffer layer T-BUF having a planarization performance made of an organic insulating material may prevent damage to each encapsulation layer (PAS1, PCL, PAS2) in the encapsulation layer ENCAP due to the bending of the organic light emitting display device and cracking of the touch sensor metal formed on the touch buffer layer T-BUF.

According to the mutual capacitance-based touch sensor structure, the X-touch electrode lines X-TEL and the Y-touch electrode lines Y-TEL may be disposed on the touch buffer layer T-BUF, and the X-touch electrode lines X-TEL and the Y-touch electrode lines Y-TEL may be disposed to cross each other.

Each of the plurality of Y-touch electrode lines Y-TEL may include the plurality of Y-bridge electrodes Y-BE electrically connecting the plurality of Y-touch electrodes Y-TE to each other. As shown in FIG. 7, the plurality of Y-touch electrodes Y-TE and the plurality of Y-bridge electrodes Y-BE may be located on different layers. An interlayer insulating film ILD may be disposed between the plurality of Y-touch electrodes Y-TE and the plurality of Y-bridge electrodes Y-BE.

The plurality of Y-touch electrodes Y-TE are disposed adjacent to each other in a second direction (y-axis direction) and may be spaced apart from each other at regular intervals. Each of the plurality of Y-touch electrodes Y-TE may be electrically connected to another Y-touch electrode Y-TE adjacent in the second direction (y-axis direction) through the Y-bridge electrode Y-BE.

The Y-bridge electrode Y-BE may be positioned on the touch buffer layer T-BUF, and may be exposed through a touch contact hole penetrating the interlayer insulating layer ILD to be electrically connected to two Y-touch electrodes Y-TE adjacent in the second direction (y-axis direction). The Y-bridge electrode Y-BE may be disposed to overlap the bank BANK. Accordingly, it is possible to prevent a decrease in the aperture ratio due to the Y-bridge electrode Y-BE.

Each of the plurality of X-touch electrode lines X-TEL may include the plurality of X-touch electrodes X-TE and the plurality of X-bridge electrodes X-BE electrically connecting the plurality of X-touch electrodes X-TE. The X-bridge electrode X-BE may be disposed on the same plane as the X-touch electrodes X-TE and be electrically connected to two X-touch electrodes X-TE adjacent in the first direction (x-axis direction) without a separate contact hole. Alternatively, the X-bridge electrode X-BE may be integrated with two X-touch electrodes X-TE adjacent in the first direction (x-axis direction). The X-bridge electrode X-BE may be disposed to overlap the bank BANK. Accordingly, it is possible to prevent a decrease in the aperture ratio due to the X-bridge electrode X-BE.

Meanwhile, the Y-touch electrode line Y-TEL may be electrically connected to the touch driving circuit 160 through a Y-touch routing wiring Y-TRW and a Y-touch pad Y-TP. The X-touch electrode line X-TEL may be electrically connected to the touch driving circuit 160 through the X-touch routing wiring X-TRW and the X-touch pad X-TP.

Referring to FIG. 7, the encapsulation layer ENCAP may include an outer inclined surface SLP. The transparent touch display device 100 may further include the dam unit DAM positioned in an area where an outer inclined surface SLP of the encapsulation layer ENCAP ends, the touch pad unit TP located in the non-display area NDA and further outside the dam unit DAM, and the Y-touch routing wiring Y-TRW electrically connecting the Y-touch electrode Y-TE among the plurality of touch electrodes TE to the Y-touch pad Y-TP among the touch pad unit TP.

The Y-touch routing wiring Y-TRW may include a wiring metal that descends along an outer inclined surface SLP of the encapsulation layer ENCAP, passes an upper portion of the dam unit DAM, and is electrically connected to the Y-touch pad Y-TP of the touch pad unit TP.

The Y-touch routing wiring Y-TRW may be electrically connected to the Y-touch electrode Y-TE through the touch routing wiring contact hole, or may be integrated with the Y-touch electrode Y-TE. The Y-touch routing wiring Y-TRW may extend to the non-display area NDA and may be electrically connected to the Y-touch pad Y-TP through upper and side surfaces of the encapsulation layer ENCAP and the upper and side surfaces of the dam unit DAM. Accordingly, the Y-touch routing wiring Y-TRW may be electrically connected to the touch driving circuit 160 through the Y-touch pad Y-TP. The Y-touch routing wiring Y-TRW may transmit a touch sensing signal from the Y-touch electrode Y-TP to the touch driving circuit 160, and/or may receive a touch driving signal from the touch driving circuit 160 and transmit the touch driving signal to the Y-touch electrode Y-TE.

The X-touch routing wiring X-TRW may be electrically connected to the X-touch electrode X-TE through the touch routing wiring contact hole, or may be integrated with the X-touch electrode X-TE. The X-touch routing wiring X-TRW may extend to the non-display area NDA and may be electrically connected to the X-touch pad X-TP through the top and side surfaces of the encapsulation layer ENCAP and the top and side surfaces of the dam unit DAM. Accordingly, the X-touch routing wiring X-TRW may be electrically connected to the touch driving circuit 160 through the X-touch pad X-TP. The X-touch routing wiring X-TRW may receive a touch driving signal from the touch driving circuit 160 and transmit the touch driving signal to the X-touch electrode X-TE, and/or may transmit a touch sensing signal from the X-touch electrode X-TE to the touch driving circuit 160.

Referring to FIG. 7, a touch passivation layer PAC may be disposed on the X-touch electrode X-TE and the Y-touch electrode Y-TE. The touch passivation layer PAC may extend before or after the dam unit DAM and may be disposed on the X-touch routing wiring X-TRW and the Y-touch routing wiring Y-TRW.

Meanwhile, the sectional view of FIG. 7 conceptually shows the structure, and the position, thickness, or width of each pattern (various layers or various electrodes) may vary depending on the viewing direction or position, and the connection structure of various patterns may also be changed. In addition, additional layers may be further present, and some of the illustrated layers may be omitted or integrated. For example, the width of the bank BANK may be narrower than that of the drawing, and the height of the dam unit DAM may be lower or higher than that of the drawing.

Figure 8:
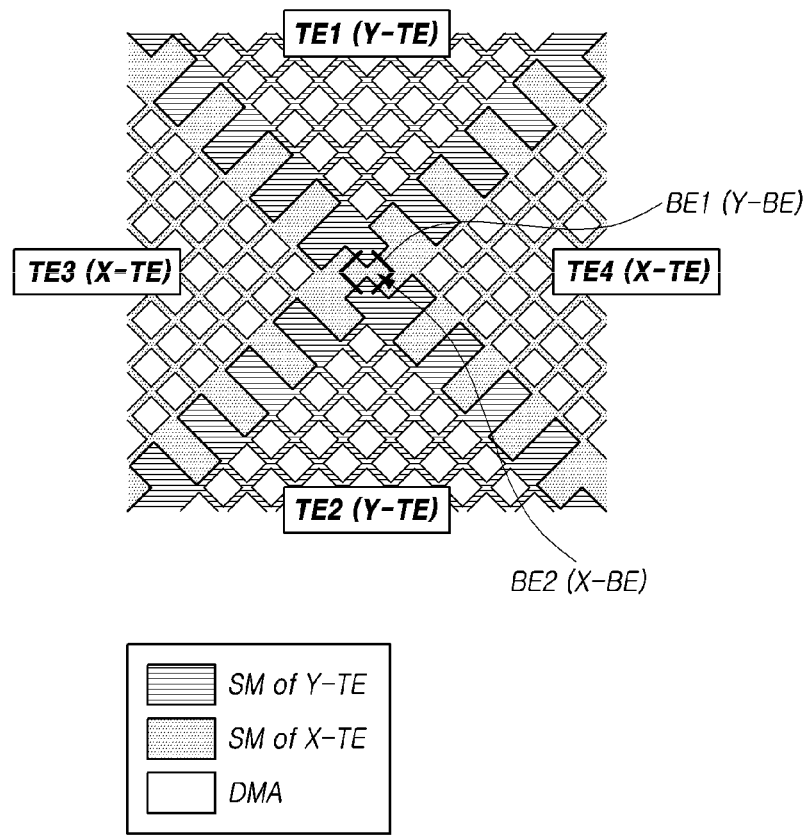
FIG. 8 is a plan view of an area in which first to fourth touch electrodes are formed in the display panel of the transparent touch display device according to embodiments of the present disclosure.

FIG. 8 is a plan view of an area in which first to fourth touch electrodes TE1 to TE4 are formed in the display panel 110 of the transparent touch display device 100 according to embodiments of the present disclosure. FIG. 8 is the plan view of a partial area 600 of FIG. 6.

Referring to FIG. 8, the plurality of touch electrodes TE includes a first touch electrode TE1 and a second touch electrode TE2 adjacent to each other in a second direction (e.g., column direction) and electrically connected to each other. The plurality of touch electrodes TE may further include third touch electrode TE3 and fourth touch electrode TE4 adjacent to each other in a first direction (e.g., row direction) and electrically connected to each other.

In FIG. 8, each of the first to fourth touch electrodes TE1 to TE4 includes a sensor metal SM. Dummy areas DMA in which dummy metals DM are located may exist in each area of the first to fourth touch electrodes TE1 to TE4.

The sensor metal SM of each of the first to fourth touch electrodes TE1 to TE4 may be patterned in a mesh type, and the dummy metals DM disposed in the respective area of the first to fourth touch electrodes TE1 to TE4 may also be patterned in a mesh type.

Referring to FIG. 8, the first touch electrode TE1 and the second touch electrode TE2 adjacent in the second direction may be Y-touch electrodes Y-TE adjacent in the y-axis direction (second direction). The third touch electrodes TE3 and fourth touch electrode TE4 adjacent in the first direction may be X-touch electrodes X-TE adjacent in the x-axis direction (first direction).

Referring to FIG. 8, the first touch electrode TE1 and the second touch electrode TE2 adjacent in the second direction may be electrically connected by the first bridge electrode BE1. The third touch electrode TE3 and the fourth touch electrode TE4 adjacent in the first direction may be electrically connected by the second bridge electrode BE2.

Referring to FIG. 8, the first bridge electrode BE1 and the second bridge electrode BE2 may cross each other.

The first bridge electrode BE1 may be positioned on a different layer from the first touch electrode TE1 and the second touch electrode TE2. The second bridge electrode BE2 may be positioned on the same layer as the third touch electrode TE3 and the fourth touch electrode TE4. The second bridge electrode BE2 may be integrally formed with the third touch electrode TE3 and the fourth touch electrode TE4.

The first bridge electrode BE1 may be positioned on a different layer from the first to fourth touch electrodes TE1 to TE4. The second bridge electrode BE2 may be positioned on the same layer as the first to fourth touch electrodes TE1 to TE4. There may be one, two, or three or more first bridge electrodes BE1.

Figure 9:
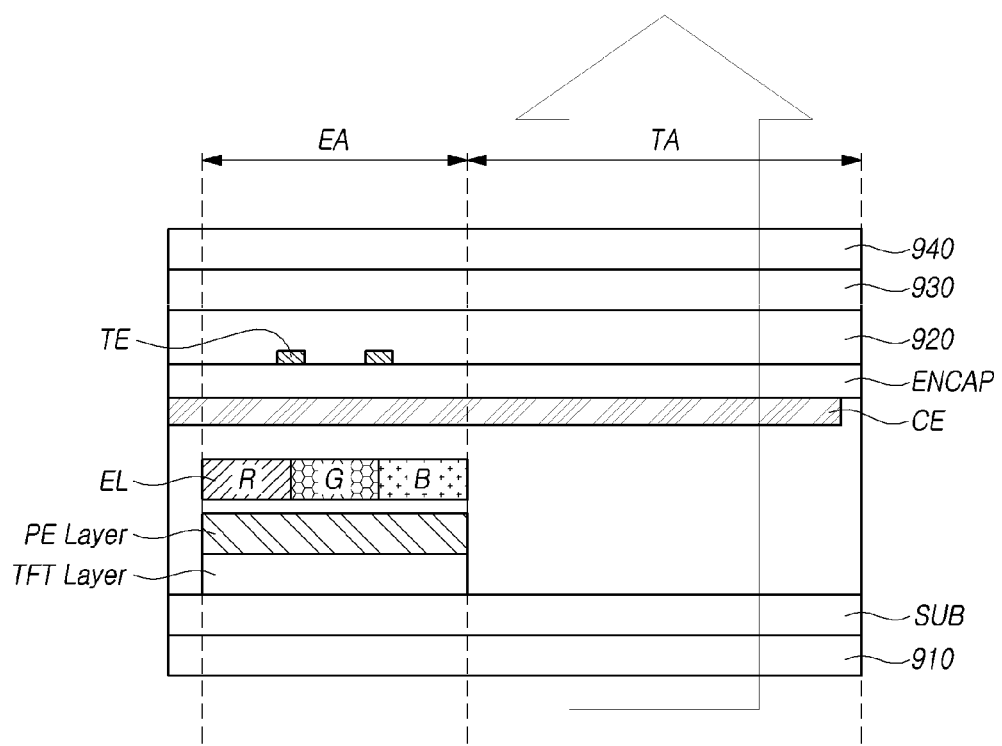
FIG. 9 is a diagram schematically illustrating a sectional structure of each of a light emitting area and a transmissive area in the display panel of the transparent touch display device according to embodiments of the present disclosure.

FIG. 9 is a diagram schematically illustrating a sectional structure of each of the light emitting area EA and the transmissive area TA in the display panel 110 of the transparent touch display device 100 according to embodiments of the present disclosure.

Referring to FIG. 9, in the transparent touch display device 100, the light emitting area EA and the transmissive area TA of the subpixel SP may be disposed adjacent to each other.

Each light emitting area EA may include a TFT (Thin Film Transistor) layer on which transistors DRT and SCT are formed on the substrate SUB, a PE (Pixel Electrode) layer positioned on the TFT Layer, and a light emitting layer EL positioned on the PE layer. In addition, a common electrode CE may be disposed on the light emitting layer EL in each light emitting area EA.

TFT layer, PE layer and light emitting layer EL may exist in the light emitting area EA, and the common electrode CE may exist in both the light emitting area EA and the transmissive area TA.

The common electrode CE may be a transparent electrode (e.g., a transparent cathode electrode) having a transmittance equal to or greater than a predetermined threshold transmittance. Alternatively, the common electrode CE may be an electrode having a transmittance less than the critical transmittance in the light emitting area EA, and may be a transparent electrode having a transmittance greater than or equal to the critical transmittance in the transmissive area TA.

When the encapsulation layer ENCAP may be disposed on or over the common electrode CE and the touch electrodes TE may be disposed on or over the encapsulation layer ENCAP, so that the touch panel TSP may be configured. The touch panel TSP may further include a touch passivation layer PAC overlaying or covering the touch electrodes TE. The touch panel TSP may be bonded to the cover layer 930 through the adhesive layer 920. The cover layer 930 may include a cover glass or a cover film.

Referring to FIG. 9, A lower anti-reflective film 910 may be further disposed under the substrate SUB, and an upper anti-reflective film 940 may be further disposed on the cover layer 930.

Referring to FIG. 9, all layer configurations disposed in the transmissive area TA may have a transmittance greater than or equal to a predetermined threshold transmittance.

A polarizing plate may be a structure that is disposed in all areas including the light-emitting area EA and the transmission area TA, and has an anti-reflection effect. The display panel 110 of the transparent touch display device 100 may not have a polarizing plate disposed in order to increase the transmittance in the transmissive area TA.

In this way, for high transmittance in the transmissive area TA, if the polarizing plate having anti-reflection effect is not disposed, the transmittance may be improved in the transmissive area TA. But if the polarizing plate having anti-reflection effect is not disposed, in the light emitting area EA, reflection by the sensor metal SM of the touch electrodes EA positioned on the uppermost layer may increase. Due to such an increase in reflection, an image anomaly in which a grid pattern caused by a mesh pattern of the touch electrodes TE is recognized may occur. Such an image anomaly is also referred to as a moiré phenomenon.

In order to increase the transmittance in the transmissive area TA and prevent image abnormalities in the light emitting area EA, a polarizing plate is not applied, and color filters and a black matrix are disposed on or over the encapsulation layer ENCAP in the light emitting area EA. The black matrix may be disposed to overlap the touch electrodes TE. In this case, it is possible to prevent image abnormalities caused by non-application of the polarizing plate, but a process procedure for forming color filters and black matrix must be additionally performed. Therefore, it may cause a problem of increasing the complexity of the manufacturing process.

Accordingly, embodiments of the present disclosure may provide a method of preventing image anomalies that may occur when a polarizing plate is not applied in order to improve transmittance without going through a complicated process procedure. That is, the embodiments of the present disclosure can improve transmittance, prevent image abnormalities, and prevent process complexity. Accordingly, in some embodiments, the transparent touch display device 100 according to embodiments of the present disclosure has a low-reflective structure of touch sensor components including touch electrodes TE and the like under a structure in which a polarizing plate is not applied. Hereinafter, a low reflection structure of touch sensor components including touch electrodes and the like will be described in detail.

Figure 10:
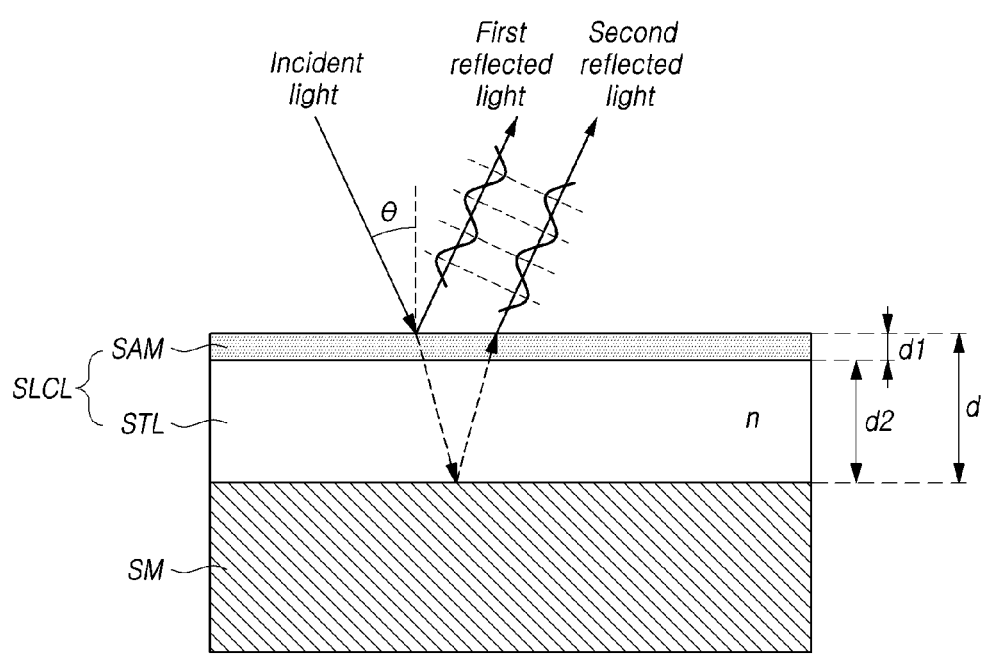
FIG. 10 is a sectional view of a touch electrode having a low reflection structure in the display panel of the transparent touch display device according to embodiments of the present disclosure.

FIG. 10 is a sectional view of the touch electrode TE having a low reflection structure in the display panel 110 of the transparent touch display device 100 according to embodiments of the present disclosure.

The transparent touch display device 100 includes a substrate SUB, a driving transistor DRT on the substrate SUB, a pixel electrode PE, a light emitting layer EL, a common electrode CE, an encapsulation layer ENCAP, and a plurality of touch electrodes TE. Here, the substrate SUB may include a display area DA in which an image is displayed and a non-display area NDA positioned outside the display area DA. Here, the display area DA may include a plurality of light emitting areas EA and a plurality of transmissive areas TA.

Each of the plurality of subpixels SP may include the driving transistor DRT, the pixel electrode PE, the light emitting layer EL, and the like. The common electrode CE may exist in common with respect to the plurality of subpixels SP.

More specifically, the driving transistor DRT may be disposed in each of the plurality of subpixels SP corresponding to the plurality of light emitting areas EA. The pixel electrode PE may be disposed in each of the plurality of light emitting areas EA, and may be electrically connected to a source electrode or a drain electrode of the driving transistor DRT disposed in each of the plurality of subpixels SP. The light emitting layer EL may be disposed in each of the plurality of light emitting areas EA, and may be disposed on the pixel electrode PE. The common electrode CE may be positioned on the light emitting layer EL and may be disposed over a plurality of light emitting areas EA and a plurality of transmissive areas TA. For example, the common electrode CE may be a transparent common electrode.

Each of the plurality of touch electrodes TE basically includes a mesh-type sensor metal SM in which a plurality of openings OA are formed. Each of the plurality of touch electrodes TE may further include a sensor light control layer SLCL on the sensor metal SM in order to implement a low reflection structure.

The sensor metal SM of each touch electrode TE may be a portion corresponding to a practical touch electrode TE. That is, the sensor metal SM may be a part to which a touch driving signal is applied or a part to which a touch sensing signal is sensed.

The sensor light control layer SLCL of each touch electrode TE may be an additional layer for a low reflection structure. In some cases, the sensor light control layer SLCL of each touch electrode TE, like the sensor metal SM, may be a part to which a touch driving signal is applied or a part in which a touch sensing signal is sensed.

Referring to FIG. 10, the sensor light control layer SLCL of each of the plurality of touch electrodes TE may include a sensor transmission layer STL located on the sensor metal SM and a sensor auxiliary metal SAM located on the sensor transmission layer STL.

Referring to FIG. 10, a part of incident light incident on the upper surface of the sensor auxiliary metal SAM may be reflected from the upper surface of the sensor auxiliary metal SAM. Another part of the incident light incident on the upper surface of the sensor auxiliary metal SAM may be reflected from the upper surface of the sensor metal SM after passing through the sensor auxiliary metal SAM and the sensor transmission layer STL.

Referring to FIG. 10, a light path difference may occur between the first reflected light reflected from the upper surface of the sensor auxiliary metal SAM and the second reflected light reflected from the upper surface of the sensor metal SM. For example, a difference in a light path between the first reflected light reflected from the upper surface of the sensor auxiliary metal SAM and the second reflected light reflected from the upper surface of the sensor metal SM may be an odd multiple of a half wavelength. That is, the phase difference (corresponding to the light path difference) between the first reflected light reflected from the upper surface of the sensor auxiliary metal SAM and the second reflected light reflected from the upper surface of the sensor metal SM may be an odd multiple of the half wavelength.

Due to the light path difference and the phase difference, the first reflected light reflected from the upper surface of the sensor auxiliary metal SAM and the second reflected light reflected from the upper surface of the sensor metal SM cause destructive interference.

Accordingly, even if the reflected light (the second reflected light) is generated from the upper surface of the sensor metal SM of the touch electrode TE, the reflected light (the second reflected light) from the upper surface of the sensor metal SM may be canceled by the reflected light (the first reflected light) generated from the upper surface of the sensor auxiliary metal SAM added over the sensor metal SM. Accordingly, reflected lights directed toward the viewing surface of the display panel disappears, and an image abnormal phenomenon (e.g., moiré phenomenon) caused by reflection may be prevented.

The display panel 110 of the transparent touch display device 100 may improve transmittance through non-applying of the polarizing plate and prevent image abnormalities that may occur when the polarizing plate is not applied without going through a complicated process procedure (e.g., color filter and black matrix formation process procedure). That is, the display panel 110 of the transparent touch display device 100 may have an effect of improving transmittance, preventing image abnormalities, and preventing process complexity through a non-applied polarizing plate and a low reflection structure of the touch electrodes.

As described above, each of the plurality of touch electrodes TE may have a multilayer structure including the sensor metal SM, the sensor transmission layer STL, and the sensor auxiliary metal SAM. A low reflection structure may be realized due to the multilayer structure of each of the plurality of touch electrodes TE. In the following, the principle of low reflection by the multilayer structure will be described in more detail.

Referring to FIG. 10, when the wavelength of incident light is k, the refractive index of the sensor transmission layer STL is n, and the incident angle of incident light is θ, the sum (d=d1+d2) of the thickness d1 of the sensor auxiliary metal SAM and the thickness d2 of the sensor transmission layer STL may be set to satisfy Equation 1 below.

$$\frac{2m+1}{2} \times \lambda = \text{2nd}\cos\theta \quad (m\text{: an integer greater that or equal to 0})$$

Equation 1

In Equation 1, the left side(((2m+1)/2)*λ) means that the phase difference between the first reflected light reflected from the upper surface of the sensor auxiliary metal SAM and the second reflected light reflected from the upper surface of the sensor metal SM becomes an odd multiple of a half wavelength (e.g., phase difference=λ/2, 3*λ/2, 5*λ/2, 7*λ/2, . . . ).

In Equation 1, the right side (2nd cos θ) denotes a difference in the optical path between the first reflected light reflected from the upper surface of the sensor auxiliary metal SAM and the second reflected light reflected from the upper surface of the sensor metal SM.

Accordingly, Equation 1 may mean a conditional expression in which the difference in the optical path between the first reflected light reflected from the upper surface of the sensor auxiliary metal SAM and the second reflected light reflected from the upper surface of the sensor metal SM becomes an odd multiple of the half wavelength.

The wavelength λ of incident light may be in a wavelength range of visible light.

The refractive index n of the sensor transmission layer STL, the thickness d1 of the sensor auxiliary metal SAM, and the thickness d2 of the sensor transmission layer STL may be design factors. For example, when the sensor transmission layer STL is ITO (Indium Tin Oxide), assuming that the refractive index n is about 1.8, m=0, the angle θ of incidence=0 degrees, and the wavelength k of the incident light is 550 nm, the thickness d of the sum of the thickness d1 of the sensor auxiliary metal SAM and the thickness d2 of the sensor transmission layer STL may be calculated as 76.4 nm (764 Å).

Assuming that the wavelength k of the incident light may be in the range of 380 nm to 770 nm, d may be designed to be 52.75 nm to 107 nm (527 Å to 1070 Å). The sensor auxiliary metal SAM may be much thinner than the sensor transmission layer STL. For example, when the thickness d2 of the sensor transmission layer STL may be approximately 85% of the sum d of the thickness d1 of the sensor auxiliary metal SAM and the thickness d2 of the sensor transmission layer STL, the thickness d2 of the sensor transmission layer STL may be designed to be 45 nm to 90 nm (450 Å to 900 Å).

Referring to FIG. 10, the sum d of the thickness d1 of the sensor auxiliary metal SAM and the thickness d2 of the sensor transmission layer STL may be smaller than the wavelength λ of incident light (d<λ). The thickness d1 of the sensor auxiliary metal SAM may be smaller than the thickness d2 of the sensor transmission layer STL (d1<d2). As described above, as the thickness d1 of the sensor auxiliary metal SAM becomes thinner, the sum d of the thickness d1 of the sensor auxiliary metal SAM and the thickness d2 of the sensor transmission layer STL becomes equal to the thickness d2 of the sensor transmission layer STL, and the light refraction phenomenon in the sensor auxiliary metal SAM can be ignored. Accordingly, it is possible to more efficiently and easily design light control for generating destructive interference between the first reflected light and the second reflected light.

Meanwhile, in some cases, the sum d of the thickness d1 of the sensor auxiliary metal SAM and the thickness d2 of the sensor transmission layer STL may be less than or greater than the wavelength λ of the incident light according to the m value of Equation 1 above. In addition, the sum d of the thickness d1 of the sensor auxiliary metal SAM and the thickness d2 of the sensor transmission layer STL may be designed to be an easy value in consideration of the process.

Accordingly, Equation 1 may be satisfied. Accordingly, the first reflected light reflected from the upper surface of the sensor auxiliary metal SAM and the second reflected light reflected from the upper surface of the sensor metal SM cause destructive interference, so that an image abnormal phenomenon due to reflection may be prevented. In addition, based on Equation 1, the thickness d1 of the sensor auxiliary metal SAM and the thickness d2 of the sensor transmission layer STL may be accurately set or the material of the sensor transmission layer STL may be accurately selected so as to prevent image abnormalities. Here, the selection of the material of the sensor transmission layer STL may mean determination of the refractive index n.

Referring to FIG. 10, the sensor transmission layer STL may include a transparent electrode (transparent metal) or may be a transparent non-metal. When the sensor transmission layer STL includes a transparent electrode, the sensor auxiliary metal SAM and the sensor metal SM may be electrically connected by the sensor transmission layer STL. Accordingly, the electrical resistance of the touch electrode TE decreases, so that the time constant of the touch sensor configuration including the touch electrode TE may decrease. Accordingly, it is possible to accurately transmit electrical signals (touch driving signals and touch sensing signals) through the configuration of the touch sensor, and the touch sensitivity can be improved.

Referring to FIG. 10, the sensor metal SM and the sensor auxiliary metal SAM of each of the plurality of touch electrodes TE may be disposed to avoid the light emitting area EA and the transmissive area TA as much as possible. That is, the sensor metal SM and the sensor auxiliary metal SAM of each of the plurality of touch electrodes TE may be disposed so as not to overlap all or part of the light emitting area EA and the transmissive area TA. Accordingly, it is possible to provide a touch sensing function while preventing a decrease in light emission performance and transmittance as much as possible.

A plurality of subpixels SP may be formed in an area in which one touch electrode TE is formed. Accordingly, in an area where one touch electrode TE is formed, the transmissive areas TA and the light emitting areas EA of the plurality of subpixels SP may exist.

In this arrangement, the plurality of openings OA formed in each of the plurality of touch electrodes TE may be positioned to correspond to the plurality of light emitting areas EA and the plurality of transmissive areas TA. Accordingly, high transmission performance can be provided, and high light emission performance can be provided even if the touch electrodes TE are disposed between the light emitting device ED and the viewing surface.

Figure 11:
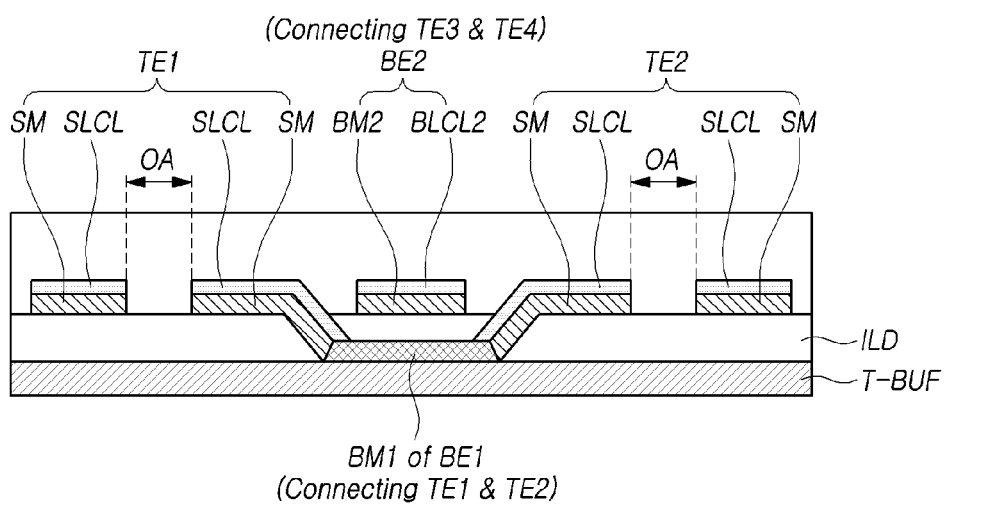
FIGS. 11 and 12 are sectional views of an area where a first bridge electrode and a second bridge electrode intersect in the display panel of the transparent touch display device according to embodiments of the present disclosure.
Figure 11:
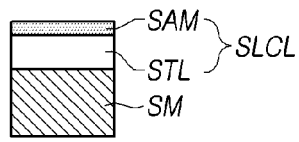
Figure 11:
Figure 11:
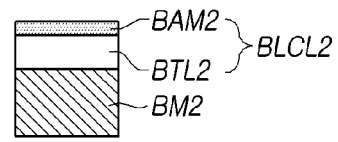
Figure 12:
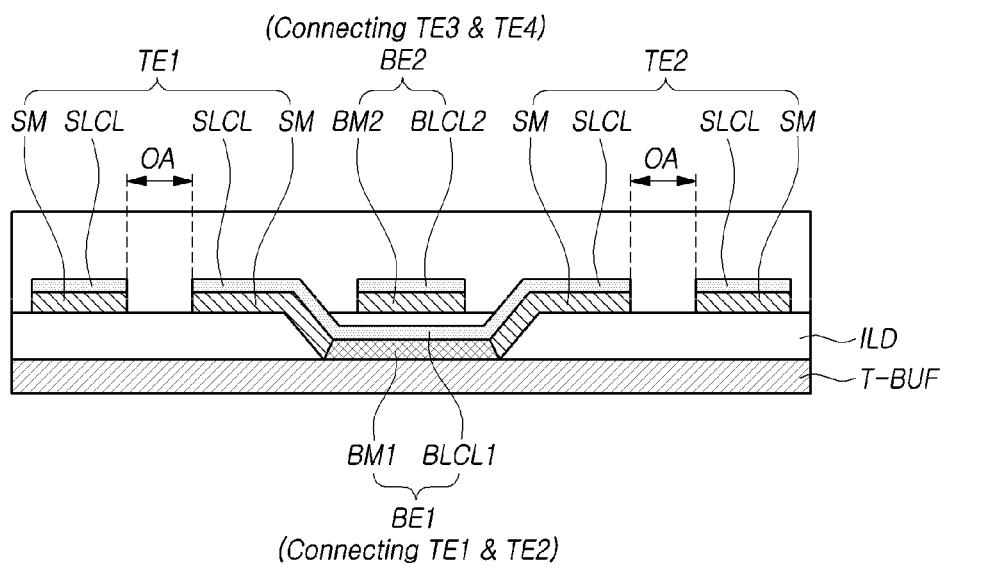
Figure 12:
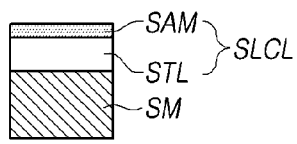
Figure 12:
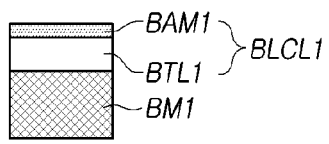
Figure 12:
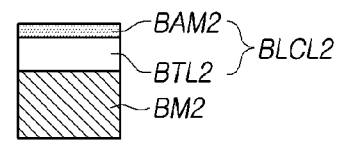

FIGS. 11 and 12 are sectional views of an area where a first bridge electrode BE1 and a second bridge electrode BE2 intersect in the display panel 110 of the transparent touch display device 100 according to embodiments of the present disclosure.

Referring to FIG. 11, the first touch electrode TE1 and the second touch electrode TE2 are disposed adjacent to each other in the second direction, and may be electrically connected to each other by the first bridge electrode BE1. The third touch electrode TE3 and the fourth touch electrode TE4 are disposed adjacent to each other in the first direction and may be electrically connected by the second bridge electrode BE2. The second bridge electrode BE2 may be disposed to cross the first bridge electrode BE1 and partially overlap the first bridge electrode BE1.

The first bridge electrode BE1 may be positioned on a different layer from the first touch electrode TE1 and the second touch electrode TE2. The second bridge electrode BE2 may be located on the same layer as the first touch electrode TE1 and the second touch electrode TE2. The second bridge electrode BE2 may be integrally formed with the third touch electrode TE3 and the fourth touch electrode TE4.

Referring to FIG. 11, the first bridge electrode BE1 may include a first bridge metal BM1. The first bridge metal BM1 may be positioned on a different layer from the first touch electrode TE1 and the second touch electrode TE2 with the interlayer insulating layer ILD interposed therebetween.

Referring to FIG. 11, a part of the first bridge metal BM1 may be electrically connected to the sensor metal SM of the first touch electrode TE1 through the first contact hole of the interlayer insulating layer ILD. Another part of the first bridge metal BM1 may be electrically connected to the sensor metal SM of the second touch electrode TE2 through the second contact hole of the interlayer insulating layer ILD. Through this, even if the first bridge electrode BE1 crosses the second bridge electrode BE2, the first touch electrode TE1 and the second touch electrode TE2 can be effectively connected.

Referring to FIG. 11, the second bridge electrode BE2 may be integrally formed with the third and fourth touch electrodes TE3 and TE4. The second bridge electrode BE2 may have the same multilayer structure as the third and fourth touch electrodes TE3 and TE4. Each of the first to fourth touch electrodes TE1 to TE4 may include a sensor metal SM and a sensor light control layer SLCL on the sensor metal SM. The sensor light control layer SLCL may include a sensor transmission layer STL disposed on the sensor metal SM and a sensor auxiliary metal SAM disposed on the sensor transmission layer STL.

Referring to FIG. 11, the second bridge electrode BE2 may include a second bridge metal BM2 and a second bridge light control layer BLCL2 positioned on the second bridge metal BM2.

Referring to FIG. 11, the second bridge light control layer BLCL2 of the second bridge electrode BE2 may include a second bridge transmission layer BTL2 on the second bridge metal BM2, and a second bridge auxiliary metal BAM2 on the second bridge transmission layer BTL2.

In other words, the second bridge electrode BE2 may include a second bridge metal BM2, a second bridge transmission layer BTL2 on the second bridge metal BM2, and a second bridge auxiliary metal BAM2 on the second bridge transmission layer BTL2.

Referring to FIG. 11, the second bridge metal BM2 may be integrally formed with the sensor metal SM of each of the third and fourth touch electrodes TE3 and TE4. The second bridge transmission layer BTL2 may be integrally formed with the sensor transmission layer STL of each of the third and fourth touch electrodes TE3 and TE4. The second bridge auxiliary metal BAM2 may be integrally formed with the sensor auxiliary metal SAM of each of the third and fourth touch electrodes TE3 and TE4.

Referring to FIG. 11, the second bridge metal BM2 may include the same material as the sensor metal SM of each of the third and fourth touch electrodes TE3 and TE4. The second bridge metal BM2 may be formed to have the same thickness as the sensor metal SM of each of the third and fourth touch electrodes TE3 and TE4. The second bridge transmission layer BTL2 may include the same material as the sensor transmission layer STL of each of the third and fourth touch electrodes TE3 and TE4. The second bridge transmission layer BTL2 may be formed to have the same thickness as the sensor transmission layer STL of each of the third and fourth touch electrodes TE3 and TE4. The second bridge auxiliary metal BAM2 may include the same material as the sensor auxiliary metal SAM of each of the third and fourth touch electrodes TE3 and TE4. The second bridge auxiliary metal BAM2 may be formed to have the same thickness as the sensor auxiliary metal SAM of each of the third and fourth touch electrodes TE3 and TE4.

That is, the second bridge electrode BE2 may have the same multilayer structure as the touch electrode TE. Accordingly, the second bridge electrode BE2, like the touch electrode TE, has a low-reflective structure, and an image abnormal phenomenon caused by the second bridge electrode BE2 can be prevented.

Referring to FIG. 11, the second bridge electrode BE2 may overlap a part of the first bridge electrode BE1 with the interlayer insulating layer ILD interposed therebetween, and may be electrically separated from the first bridge electrode BE1 by the interlayer insulating layer ILD.

Referring to FIG. 11, different from the second bridge electrode BE2, the first bridge electrode BE1 may have a single layer structure composed of the first bridge metal BM1. Accordingly, the interlayer insulating layer ILD may be positioned between the first bridge metal BM1 of the first bridge electrode BE1 and the second bridge metal BM2 of the second bridge electrode BE2.

Referring to FIG. 11, if the first bridge electrode BE1 is disposed so that reflection from the first bridge electrode BE1 hardly occurs, the first bridge electrode BE1 may be formed in a single layer structure. Accordingly, there is an advantage in that the first bridge electrode BE1 can be easily formed.

Referring to FIG. 12, the first bridge electrode BE1 may have a multilayer structure, similar to the second bridge electrode BE2. In this case, the first bridge electrode BE1 may further include a first bridge light control layer BLCL1 positioned on the first bridge metal BM1. Here, the first bridge light control layer BLCL1 may include a first bridge transmission layer BTL1 on the first bridge metal BM1 and a first bridge auxiliary metal BAM1 on the first bridge transmission layer BTL1.

Referring to FIG. 12, the first bridge metal BM1 may include the same material as the sensor metal SM of each of the first and second touch electrodes TE1 and TE2. The first bridge metal BM1 may have a thickness corresponding to the sensor metal SM of each of the first and second touch electrodes TE1 and TE2. The first bridge transmission layer BTL1 may include the same material as the sensor transmission layer STL of each of the first and second touch electrodes TE1 and TE2. The first bridge transmission layer BTL1 may have a thickness corresponding to the sensor transmission layer STL of each of the first and second touch electrodes TE1 and TE2. The first bridge auxiliary metal BAM1 may include the same material as the sensor auxiliary metal SAM of each of the first and second touch electrodes TE1 and TE2. The first bridge auxiliary metal BAM1 may have a thickness corresponding to the sensor auxiliary metal SAM of each of the first and second touch electrodes TE1 and TE2.

That is, the first bridge electrode BE1 may have the same multilayer structure as the touch electrode TE. Accordingly, like the touch electrode TE, the first bridge electrode BE1 has a low reflection structure, and an image abnormal phenomenon caused by the first bridge electrode BE1 can be prevented.

Referring to FIG. 12, like the second bridge electrode BE2, the first bridge electrode BE1 has a multilayer structure. Accordingly, the interlayer insulating layer ILD may be positioned between the first bridge auxiliary metal BAM1 of the first bridge electrode BE1 and the second bridge metal BM2 of the second bridge electrode BE2.

The first bridge metal BM1 of the first bridge electrode BE1 and the second bridge metal BM2 of the second bridge electrode BE2 are portions electrically connected to the sensor metal SM of the touch electrode TE. Accordingly, the first bridge metal BM1 of the first bridge electrode BE1 and the second bridge metal BM2 of the second bridge electrode BE2 may be a portion to which a touch driving signal is applied or a touch sensing signal is sensed.

The first bridge light control layer BLCL1 of the first bridge electrode BE1 and/or the second bridge light control layer BLCL2 of the second bridge electrode BE2 may be an additional layer for a low reflection structure. In some cases, the first bridge light control layer BLCL1 of the first bridge electrode BE1 and/or the second bridge light control layer BLCL2 of the second bridge electrode BE2 may be a portion to which a touch driving signal is applied or a touch sensing signal is sensed.

Figure 13:
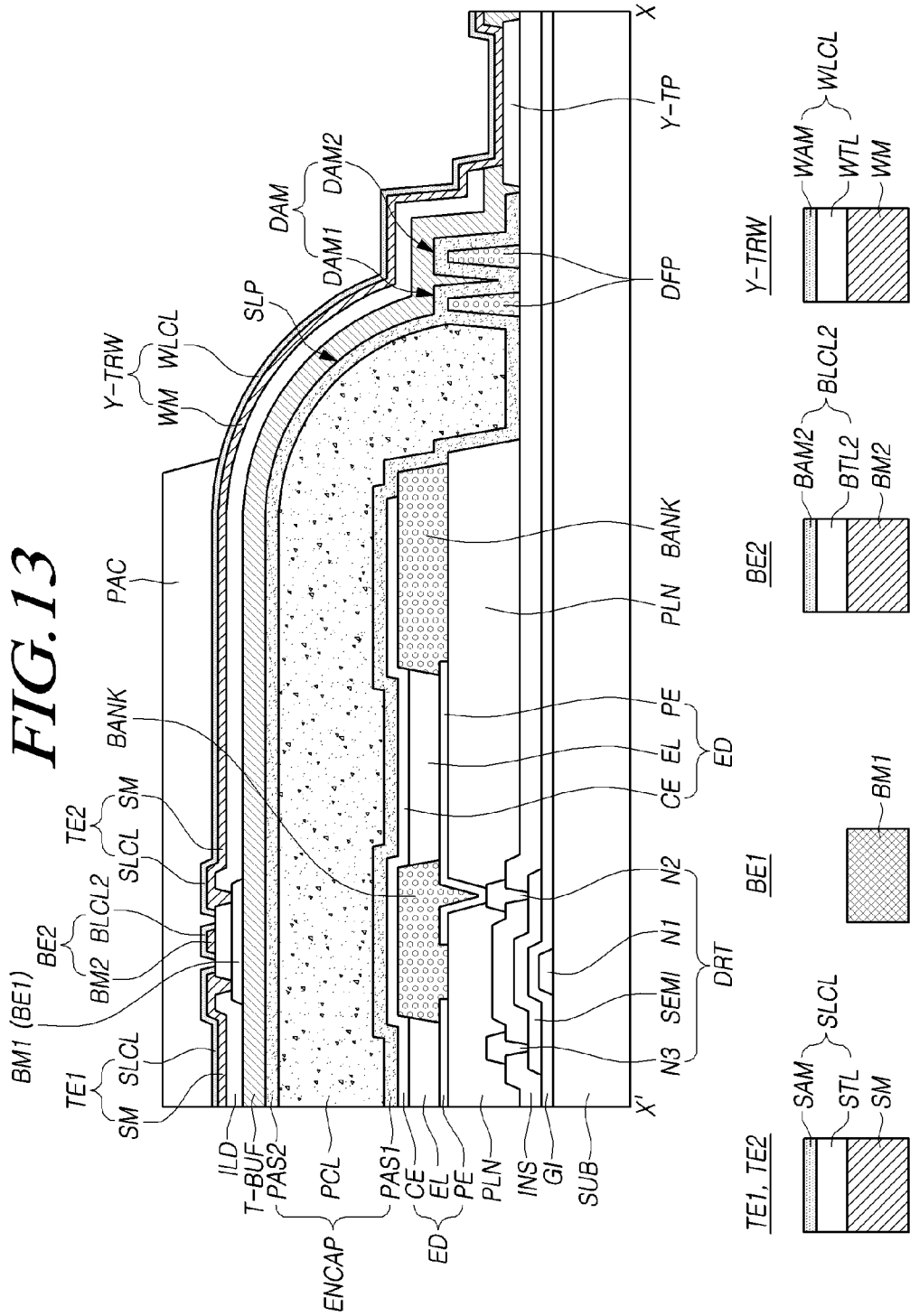
FIG. 13 is a sectional view of the display panel of the transparent touch display device according to embodiments of the present disclosure, and is a sectional view of the display panel to which the touch electrode having the low reflection structure is applied.

FIG. 13 is a sectional view of the display panel 110 of the transparent touch display device 100 according to embodiments of the present disclosure, and is a sectional view of the display panel 110 to which the touch electrode TE having the low reflection structure is applied.

The sectional structure of FIG. 13 is almost the same as the sectional structure of FIG. 7, and differs from the sectional structure of FIG. 7 only in the low-reflective structure of the touch electrode TE. In the following, features that are different from the sectional structure of FIG. 7 will be mainly described.

Referring to FIG. 13, the transparent touch display device 100 further comprise a dam unit DAM located in an area where the outer inclined surface SLP of the encapsulation layer ENCAP ends, a touch pad unit TP located in the non-display area NDA and further outside the dam unit DAM, and a touch routing wiring Y-TRW electrically connecting some of the touch electrodes TE1 and TE2 among the plurality of touch electrodes TE and the touch pad unit TP.

Referring to FIG. 13, the touch routing wiring Y-TRW may descend along an outer inclined surface SLP of the encapsulation layer ENCAP and pass over the dam unit DAM to be electrically connected to the touch pad unit TP.

The touch routing wiring Y-TRW may have a single layer structure. In this case, the touch routing wiring Y-TRW may include a wiring metal WM. Alternatively, as illustrated in FIG. 13, the touch routing wiring Y-TRW may have a multilayer structure to which a low reflection structure is applied. In this case, the touch routing wiring Y-TRW may further include a wiring metal WM and a wiring light control layer WLCL positioned on the wiring metal WM.

The wiring metal WM of the touch routing wiring Y-TRW may be a portion electrically connected to the sensor metal SM of the touch electrode TE. Accordingly, the wiring metal WM of the touch routing wiring Y-TRW may be a portion to which a touch driving signal is applied or a touch sensing signal is sensed.

The wiring light control layer WLCL of the touch routing wiring Y-TRW may be an additional layer for a low reflection structure. In some cases, like the wiring metal WM of the touch routing wiring Y-TRW, the wiring light control layer WLCL of the touch routing wiring Y-TRW may be a portion to which a touch driving signal is applied or a touch sensing signal is sensed.

Referring to FIG. 13, the wiring light control layer WLCL of the touch routing wiring Y-TRW may include a wiring transmission layer WTL located on the wiring metal WM and a wiring auxiliary metal WAM located on the wiring transmission layer WTL.

Referring to FIG. 13, the wiring metal WM of the touch routing wiring Y-TRW and the sensor metal SM of the touch electrodes TE1 and TE2 may include the same material. The wiring metal WM of the touch routing wiring Y-TRW and the sensor metal SM of the touch electrodes TE1 and TE2 may have corresponding thicknesses. The wiring auxiliary metal WAM of the touch routing wiring Y-TRW and the sensor auxiliary metal SAM of the touch electrodes TE1 and TE2 may include the same material. The wiring auxiliary metal WAM of the touch routing wiring Y-TRW and the sensor auxiliary metal SAM of the touch electrodes TE1 and TE2 may have corresponding thicknesses. The wiring transmission layer WTL of the touch routing wiring Y-TRW and the sensor transmission layer STL of the touch electrodes TE1 and TE2 may include the same material. The wiring transmission layer WTL of the touch routing wiring Y-TRW and the sensor transmission layer STL of the touch electrodes TE1 and TE2 may have corresponding thicknesses.

Accordingly, like the touch electrode TE, the touch routing wiring Y-TRW has a low reflection structure, so that an image abnormal phenomenon caused by the touch routing wiring Y-TRW can be prevented. Meanwhile, the touch routing wiring Y-TRW may have an extended second touch electrode TE2.

Figure 14:
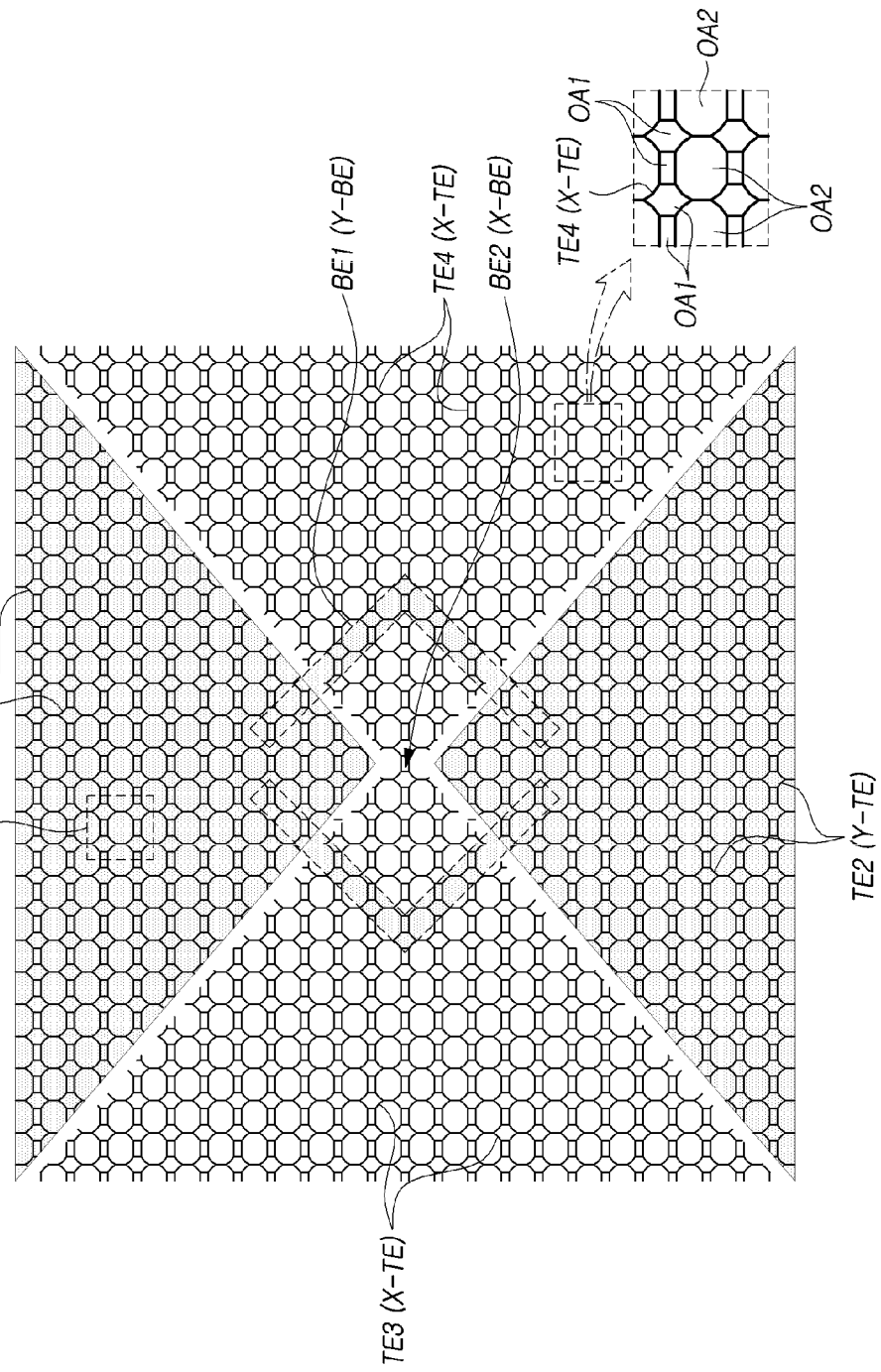
FIGS. 14 and 15 are a plan view showing mesh pattern structure of first to fourth touch electrodes having the low reflection structure and an enlarged plan view of a partial area of the plan view, when the arrangement structure of FIG. 2 is applied in the display panel of the transparent touch display device according to embodiments of the present disclosure.
Figure 15:
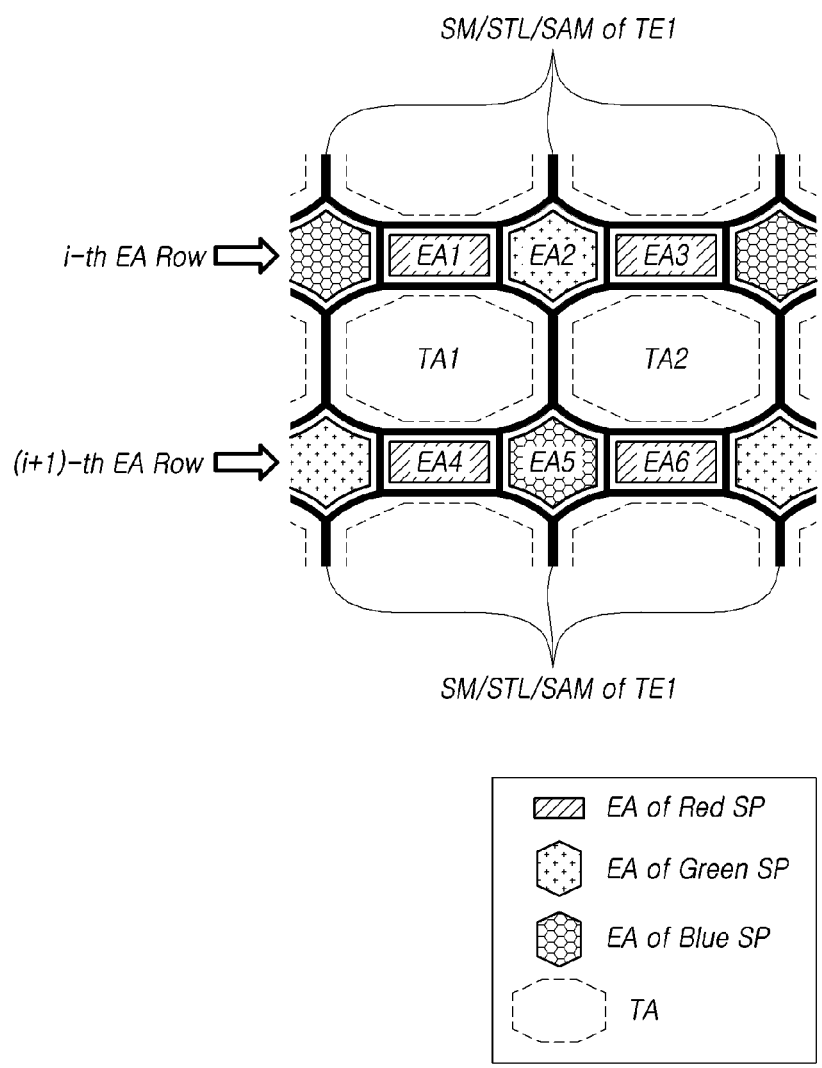

FIG. 14 is a plan view showing mesh pattern structure of first to fourth touch electrodes TE1 to TE4 having the low reflection structure, when the arrangement structure of FIG. 2 is applied in the display panel 110 of the transparent touch display device 100 according to embodiments of the present disclosure. And FIG. 15 is an enlarged plan view of a partial area 1700 of FIG. 14.

Referring to FIG. 14, the first and second touch electrodes TE1 and TE2 are disposed adjacent to each other in a second direction (e.g., column direction, y-axis direction), and may be electrically connected to each other by one or more first bridge electrodes BE1. The third and fourth touch electrodes TE3 and TE4 are disposed adjacent to each other in the first direction (e.g., row direction, x-axis direction), and may be electrically connected to each other by one or more second bridge electrodes BE2. The first and second touch electrodes TE1 and TE2 adjacent in the second direction may be Y-touch electrodes Y-TE adjacent in the y-axis direction. The third and fourth touch electrodes TE3 and TE4 adjacent in the first direction may be X-touch electrodes X-TE adjacent in the x-axis direction.

Referring to FIG. 14, the first bridge electrode BE1 and the second bridge electrode BE2 may cross each other.

Referring to FIG. 14, the first bridge electrode BE1 may be positioned on a different layer from the first and second touch electrodes TE1 and TE. The second bridge electrode BE2 may be located on the same layer as the third and fourth touch electrodes TE3 and TE4, and may be integrally formed with the third and fourth touch electrodes TE3 and TE4. That is, the first bridge electrode BE1 may be positioned on a different layer from the first to fourth touch electrodes TE1 to TE4. The second bridge electrode BE2 may be positioned on the same layer as the first to fourth touch electrodes TE1 to TE4.

Referring to FIG. 14, each of the first to fourth touch electrodes TE1 to TE4 may be formed in a multilayer structure including a sensor metal SM patterned in a mesh type and a sensor light control layer SLCL in order to realize a low reflection structure. Here, the sensor light control layer SLCL may include a sensor transmission layer STL positioned on the sensor metal SM and a sensor auxiliary metal SAM positioned on the sensor transmission layer STL.

Referring to FIG. 14, the touch driving circuit 160 may supply a touch driving signal to at least one of the plurality of driving touch electrode lines (e.g., X-TEL or Y-TEL) and sense at least one of the plurality of sensing touch electrode lines (e.g., Y-TEL or X-TEL).

Each of the plurality of driving touch electrode lines (e.g., X-TEL or Y-TEL) may be an assembly of two or more touch electrodes TE disposed adjacent to each other in a first direction or a second direction and electrically connected to each other.

Each of the plurality of sensing touch electrode lines (e.g., Y-TEL or X-TEL) may be an assembly of two or more touch electrodes TE disposed adjacent to each other in a second direction or a first direction and electrically connected to each other.

Referring to FIG. 14, the first and second touch electrodes TE1 and TE2 electrically connected by the first bridge electrode BE1 may constitute one driving touch electrode line (e.g., X-TEL or Y-TEL). The third and fourth touch electrodes TE3 and TE4 electrically connected by the second bridge electrode BE2 may constitute one sensing touch electrode line (e.g., Y-TEL or X-TEL).

Alternatively, the first and second touch electrodes TE1 and TE2 electrically connected by the first bridge electrode BE1 may constitute one sensing touch electrode line (e.g., Y-TEL or X-TEL). The third and fourth touch electrodes TE3 and TE4 electrically connected by the second bridge electrode BE2 may constitute one driving touch electrode line (e.g., X-TEL or Y-TEL).

Referring to FIG. 14, mesh patterns of the first to fourth touch electrodes TE1 to TE4 may be disposed to avoid the light emitting areas EA and the transmissive areas TA as much as possible. That is, the multilayer structure of each of the first to fourth touch electrodes TE1 to TE4 may be disposed so as to avoid the light emitting areas EA and the transmissive areas TA as much as possible. Here, the multilayer structure may include a sensor metal SM, a sensor transmission layer STL, and a sensor auxiliary metal SAM. The multilayer structure of each of the plurality of touch electrodes TE may be disposed so as not to overlap all or part of the light emitting areas EA and the transmissive areas TA. The multilayer structure of each of the plurality of touch electrodes TE may be arranged so that overlapping is reduced or minimized even when overlapping with at least one of the light emitting areas EA and the transmissive areas TA. Accordingly, it is possible to provide a touch sensing function while preventing a decrease in light emission performance and transmittance as much as possible.

The shape of the mesh pattern of the first to fourth touch electrodes TE1 to TE4 in the planar structure of FIG. 14 may be different from the shape of the mesh pattern of the first to fourth touch electrodes TE1 to TE4 in FIG. 8. The shape of the mesh pattern of the first to fourth touch electrodes TE1 to TE4 may vary according to the arrangement structure of the light emitting areas EA and the transmissive areas TA.

The shape of the mesh pattern of the first to fourth touch electrodes TE1 to TE4 illustrated in FIG. 14 is suitable for the arrangement structure of the light emitting areas (EA1, EA2, EA3, EA4, EA5, EA6) and the transmissive areas (TA1, TA2) of FIG. 15.

Referring to FIGS. 14 and 15, an area occupied by each of the first to fourth touch electrodes TE1 to TE4 among the plurality of touch electrodes TE may include a plurality of light emitting areas EA1 to EA6 and a plurality of transmissive areas TA1 and TA2.

Referring to FIGS. 14 and 15, a plurality of openings OA formed in each of the first to fourth touch electrodes TE1 to TE4 among the plurality of touch electrodes TE may include a plurality of first openings OA1 corresponding to the plurality of light emitting areas EA (EA1~EA6) and a plurality of second openings OA2 corresponding to the plurality of transparent areas TA (TA1, TA2). Accordingly, the mesh patterns SM, STL, and SAM of each of the first to fourth touch electrodes TE1 to TE4 may be disposed to avoid the light emitting areas EA (EA1~EA6) and the transmissive areas TA (TA1, TA2) as much as possible. Therefore, the luminous efficiency and transmittance can be significantly improved.

For example, the first opening OA1 may have a shape such as a rectangle, a hexagon, an oval, and a circle. The second opening OA2 may have a shape such as an octagon, an oval, and a circle.

Referring to FIG. 15, a plurality of first openings OA1 may correspond to first to third light emitting areas EA1 to EA3. The first to third light emitting areas EA1 to EA3 may be included in the i-th light emitting area row (i-th EA Row) and may be disposed adjacent to each other in the first direction (e.g., row direction). Referring to FIG. 15, the first opening OA1 may correspond to fourth to sixth light emitting areas EA4 to EA6. The fourth to sixth light emitting areas EA4 to EA6 may be included in the (i+1)-th light emitting area row ((i+1)-th EA Row) and may be disposed adjacent to each other in the first direction (e.g., row direction).

Here, the fourth to sixth light emitting areas EA4 to EA6 may be disposed adjacent to the first to third light emitting areas EA1 to EA3 in a second direction (e.g., column direction) crossing the first direction, respectively.

Referring to FIG. 15, the plurality of second openings OA2 may correspond to the first transmissive area TA1 and the second transmissive area TA2. The first transmissive area TA1 may be located between the first light emitting area EA1 in the i-th light emitting area row (i-th EA Row) and the fourth light emitting area EA4 in the (i+1)-th light emitting area row ((i+1)-th EA Row). The second transmissive area TA2 may be positioned between the third light emitting area EA3 in the i-th light emitting area row (i-th EA Row) and the sixth light emitting area EA6 in the (i+1)-th light emitting area row ((i+1)-th EA Row).

Referring to FIG. 15, the first transmissive area TA1 may be extended to a partial space in a space between the second emission area EA2 and the fifth emission area EA5. The second transmissive area TA2 may extend to another partial space in the space between the second emission area EA2 and the fifth emission area EA5.

Referring to, FIG. 15, the sensor auxiliary metal SAM, the sensor transmission layer STL, and the sensor metal SM included in the first touch electrode TE1 may be located between adjacent areas among the first to sixth light emitting areas EA1 to EA6 and the first and second transmissive areas TA1 and TA2.

Referring to FIG. 15, for example, the first light emitting area EA1, the third light emitting area EA3, the fourth light emitting area EA4, and the sixth light emitting area EA6 may be light emitting areas (first color light emitting areas) of the first color subpixel (e.g., Red SP). The second light emitting area EA2 may be a light emitting area (second color light emitting area) of a second color subpixel (e.g., Green SP). The fifth light emitting area EA5 may be a light emitting area (third color light emitting area) of a third color subpixel (e.g., Blue SP).

The sizes of the first light emitting area EA1, the third light emitting area EA3, the fourth light emitting area EA4, and the sixth light emitting area EA6 may correspond to each other. The sizes of the second light emitting area EA2 and the fifth light emitting area EA5 may correspond to each other. The size of each of the second and fifth light emitting areas EA2 and EA5 may be larger than the size of each of the first light emitting area EA1, the third light emitting area EA3, the fourth light emitting area EA4, and the sixth light emitting area EA6.

In addition, the sizes of the first transmissive area TA1 and the second transmissive area TA2 may correspond to each other. The sizes of each of the first and second transmissive areas TA1 and TA2 may be larger than the size of each of the second and fifth light emitting areas EA2 and EA5. Accordingly, the transmittance can be improved.

As described above, under the structure of arranging the light emitting area and the transmissive area considerably suitable for a transparent display, the low reflection structure of the touch electrode TE can be effectively applied.

Figure 16:
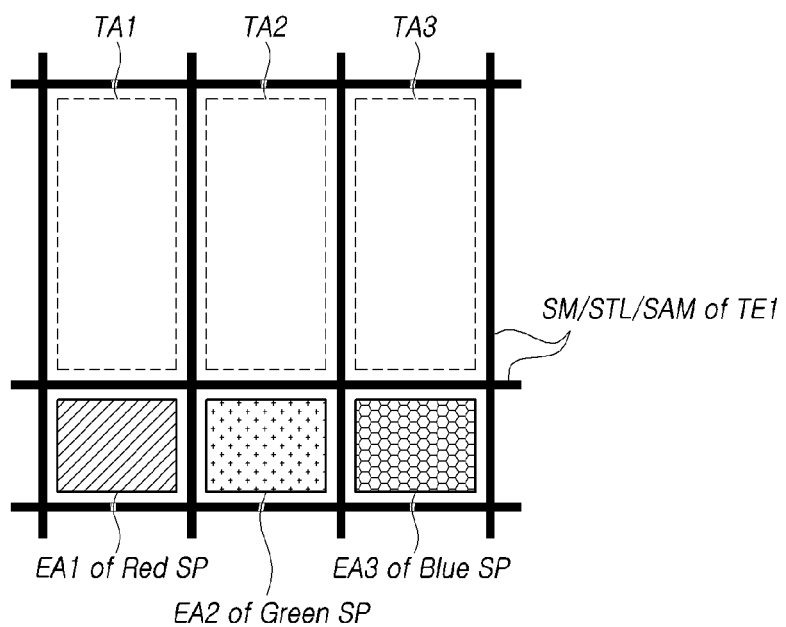
FIGS. 16 and 17 are plan views showing mesh pattern structure of the touch electrode having the low reflection structure, when the arrangement structure of FIGS. 3 and 4 are applied in the display panel of the transparent touch display device according to embodiments of the present disclosure.
Figure 17:
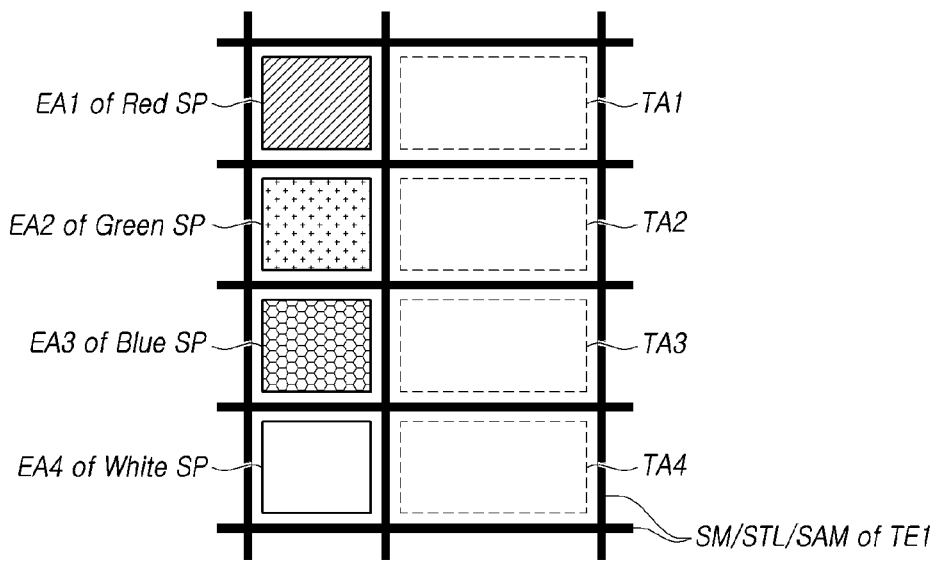

FIG. 16 is plan views showing mesh pattern structure of the touch electrode TE having the low reflection structure, when the arrangement structure of FIG. 3 is applied in the display panel 110 of the transparent touch display device 100 according to embodiments of the present disclosure. And FIG. 17 is plan views showing mesh pattern structure of the touch electrode TE having the low reflection structure, when the arrangement structure of FIG. 4 is applied in the display panel 110 of the transparent touch display device 100 according to embodiments of the present disclosure.

Referring to FIG. 16, the mesh patterns SM, STL, and SAM of the first touch electrode TE1 among the plurality of touch electrodes TE may be disposed while avoiding the light emitting areas (EA1, EA2, EA3) and the transmissive areas (TA1, TA2, TA3) as much as possible.

Accordingly, the plurality of openings OA formed in the first touch electrode TE1 may correspond to a plurality of light emitting areas (EA1, EA2, and EA3). And the plurality of openings OA formed in the first touch electrode TE1 may further correspond to a plurality of transmissive areas (TA1, TA2, and TA3) or one or more transmissive areas (One or more transmissive areas to which TA1, TA2, and TA3 are combined). Accordingly, luminous efficiency and transmittance can be significantly improved. Here, a plurality of transmissive areas may include the first to third transmissive areas TA1 to TA3. The first to third transmissive areas TA1 to TA3 may all be separate types, or two or more of the first to third transmissive areas TA1 to TA3 may be connected.

Referring to FIG. 16, the plurality of light emitting areas (EA1, EA2, and EA3) may include first light emitting area EA1, a second light emitting area EA2, and a third light emitting area EA3 adjacent to each other in a first direction. The plurality of the transmissive areas (TA1, TA2, and TA3) may include the first transmissive area TA1, the second transmissive area TA2, and the third transmissive area TA3 adjacent to each other in a first direction. The first to third transmissive areas TA1 to TA3 are disposed adjacent to the first to third light emitting areas EA1 to EA3 in a second direction.

The sensor auxiliary metal SAM, the sensor transmission layer STL, and the sensor metal SM included in the first touch electrode TE1 may be located between adjacent areas among the first to third light emitting areas EA1 to EA3 and the first to third transmissive area TA1 to TA3, or may be disposed to at least partially surround the first to third light emitting areas EA1 to EA3 and the first to third transmissive area TA1 to TA3.

Accordingly, the mesh patterns SM, STL, and SAM of the first touch electrode TE1 among the plurality of touch electrodes TE may be disposed while avoiding the light emitting areas EA1 to EA3 and the transmissive areas TA1 to TA3 as much as possible. Accordingly, luminous efficiency and transmittance can be significantly improved.

Referring to FIG. 17, the mesh patterns SM, STL, and SAM of the first touch electrode TE1 among the plurality of touch electrodes TE may be disposed while avoiding the light emitting areas EA1 to EA4 and the transmissive areas TA1 to TA4 as much as possible.

Referring to FIG. 17, a plurality of openings OA formed in the first touch electrode TE1 may correspond to a plurality of light emitting areas EA1 to EA4 and a plurality of transmissive areas TA1 to TA4. Accordingly, luminous efficiency and transmittance can be significantly improved.

Referring to FIG. 17, the plurality of light emitting areas EA1 to EA4 may include a first light emitting area EA1, a second light emitting area EA2, a third light emitting area EA3, and a fourth light emitting area EA4 adjacent to each other in a second direction. The plurality of transmissive areas TA1 to TA4 may include a first transmissive area TA1, a second transmissive area TA2, a third transmissive area TA3, and a fourth transmissive area TA4 adjacent to each other in a second direction. The first to fourth transmissive areas TA1 to TA4 may be disposed adjacent to the first to fourth light emitting areas EA1 to EA4 in a first direction.

The sensor auxiliary metal SAM, the sensor transmissive layer STL, and the sensor metal SM included in the first touch electrode TE1 may be positioned between adjacent areas among the first to fourth light emitting areas EA1 to EA4 and the first to fourth transmissive areas TA1 to TA4, or may be disposed to at least partially surround the first to fourth light emitting areas EA1 to EA4 and the first to fourth transmissive areas TA1 to TA4. Accordingly, the mesh patterns SM, STL, and SAM of the first touch electrode TE1 among the plurality of touch electrodes TE may be disposed while avoiding the light emitting areas EA1 to EA4 and the transmissive areas TA1 to TA4 as much as possible. Accordingly, luminous efficiency and transmittance can be significantly improved.

According to the foregoing, under the structure of arranging various light-emitting and transmissive regions applicable to the transparent display as illustrated in FIG. 16 or 17, the low-reflection structure of the touch electrode TE can be effectively applied.

In the above, the transparent touch display device 100 according to the embodiments of the present disclosure has been described as an organic light emitting display device. However, the low-reflection structure of the touch sensor configuration, which is the main feature of the present disclosure, may be equally applied even when the transparent touch display device 100 is a display type (e.g., liquid crystal display device, etc.) other than an organic light-emitting display device. In consideration of this point, the transparent touch display device 100 according to embodiments of the present disclosure will be briefly described again.

The transparent touch display device 100 according to the embodiments of the present disclosure may include: a display panel 110 including a plurality of data lines DL, a plurality of gate lines GL, and a plurality of touch electrodes TE; a data driving circuit 120 for driving a plurality of data lines; a gate driving circuit 130 for driving a plurality of gate lines; and a touch driving circuit 160 driving a plurality of touch electrodes TE.

The display panel 110 may include a display area DA in which an image is displayed and a non-display area NDA positioned outside the display area DA. The display area DA may include a plurality of light emitting areas EA and a plurality of transmissive areas TA.

Each of the plurality of touch electrodes TE may include: a mesh-type sensor metal SM in which a plurality of openings OA are formed; a sensor transmission layer STL positioned on the sensor metal SM; and a sensor auxiliary metal SAM positioned on the sensor transmission layer STL.

Part of the incident light incident on the upper surface of the sensor auxiliary metal SAM may be reflected from the upper surface of the sensor auxiliary metal SAM. Another part of the incident light incident on the upper surface of the sensor auxiliary metal SAM may be reflected from the upper surface of the sensor metal SM after passing through the sensor auxiliary metal SAM and the sensor transmission layer STL.

The reflected light reflected from the upper surface of the sensor auxiliary metal SAM and the reflected light reflected from the upper surface of the sensor metal SM may have a light path difference and a phase difference corresponding to an odd multiple of a half wavelength of the incident light.

The reflected light reflected from the upper surface of the sensor auxiliary metal SAM and the reflected light reflected from the upper surface of the sensor metal SM may cause destructive interference. Accordingly, an image abnormal phenomenon due to reflection from the touch electrode TE can be prevented.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown. The scope of protection of the present disclosure should be construed based on the technical ideas covered in the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transparent touch display device, comprising:
a substrate including a display area in which an image is displayed and a non-display area positioned outside the display area, the display area including a plurality of light emitting areas and a plurality of transmissive areas;
a plurality of light emitting devices disposed over the substrate;
an encapsulation layer disposed on the plurality of light emitting devices; and
a plurality of touch electrodes either disposed on or over the encapsulation layer, wherein each of the plurality of touch electrodes includes:
a mesh-type sensor metal having a plurality of openings;
a sensor transmission layer on the sensor metal; and
a sensor auxiliary metal on the sensor transmission layer,
wherein part of an incident light incident on an upper surface of the sensor auxiliary metal is reflected from the upper surface of the sensor auxiliary metal,
wherein another part of the incident light incident on the upper surface of the sensor auxiliary metal is reflected from an upper surface of the sensor metal after passing through the sensor auxiliary metal and the sensor transmission layer,
wherein an area occupied by each of the plurality of touch electrodes includes a plurality of light emitting areas and a plurality of transmissive areas,
wherein the sensor metal and the sensor auxiliary metal of each of the plurality of touch electrodes are disposed to not overlap with all of the plurality of light emitting areas and the plurality of transmissive areas, and
wherein a plurality of openings formed in each of the plurality of touch electrodes includes a plurality of first openings corresponding to the plurality of light emitting areas and a plurality of second openings corresponding to the plurality of transmissive areas.

2. The transparent touch display device according to claim 1, wherein a thickness of the sensor auxiliary metal is smaller than a thickness of the sensor transmission layer.

3. The transparent touch display device according to claim 1, wherein the sensor transmission layer includes a transparent electrode, and the sensor auxiliary metal and the sensor metal are electrically connected by the sensor transmission layer.

4. The transparent touch display device according to claim 1, wherein the plurality of openings formed in any first touch electrode among the plurality of touch electrodes include a plurality of first openings and a plurality of second openings,
wherein the plurality of first openings correspond to first to sixth light emitting areas, the first to third light emitting areas among the first to sixth light emitting areas are disposed adjacent to each other in a first direction, the fourth to sixth light emitting areas among the first to sixth light emitting areas are disposed adjacent to each other in the first direction, the fourth to sixth light emitting areas are disposed adjacent to the first to third light emitting areas in a second direction, wherein the plurality of second openings correspond to a first transmissive area and a second transmissive area, the first transmissive area is located between the first light emitting area and the fourth light emitting area among the first to sixth light emitting areas, the second transmissive area is located between the third light emitting area and the sixth light emitting area among the first to sixth light emitting areas, wherein the first transmissive area is extended to a partial space in a space between the second transmissive area and the fifth transmissive area among the first to sixth transmissive areas, the second transmissive area is extended to another partial space in the space between the second transmissive area and the fifth transmissive area among the first to sixth transmissive areas, and wherein the sensor auxiliary metal, the sensor transmission layer, and the sensor metal included in any first touch electrode among the plurality of the touch electrodes are located between adjacent areas among the first to sixth light emitting areas and the first and second transmissive areas.

5. The transparent touch display device according to claim 4, wherein the first light emitting area, the third light emitting area, the fourth light emitting area and the sixth light emitting area are a first color light emitting area, the second light emitting area is a second color light emitting area, and the fifth light emitting area is a third color light emitting area, wherein a size of each of the second light emitting area and the fifth light emitting area is larger than a size of each of the first light emitting area, the third light emitting area, the fourth light emitting area, and the sixth light emitting area, and wherein a size of each of the first transmissive area and second transmissive area is larger than a size of each of the second light emitting area and the fifth light emitting area.

6. The transparent touch display device according to claim 1, wherein the plurality of openings formed in a first touch electrode among the plurality of touch electrodes correspond to a plurality of light emitting areas and a plurality of transmissive areas, the plurality of light emitting areas include first to third light emitting areas adjacent to each other in a first direction, and the plurality of transmissive areas include first to third transmissive areas adjacent to each other in a first direction, and the first to third transmissive areas are disposed adjacent to the first to third light emitting areas in a second direction, and wherein the sensor auxiliary metal, the sensor transmission layer, and the sensor metal included in the first touch electrode are located between adjacent areas among the first to third light emitting areas and the first to third transmissive areas, or disposed to at least partially surround the first to third light emitting areas and the first to third transmissive areas.

7. The transparent touch display device of claim 1 wherein:

wherein the sensor metal and the sensor auxiliary metal of each of the plurality of touch electrodes are disposed to not overlap a part of the plurality of light emitting areas and the plurality of transmissive areas.

8. A transparent touch display device, comprising:
a substrate including a display area in which an image is displayed and a non-display area positioned outside the display area, the display area including a plurality of light emitting areas and a plurality of transmissive areas;
a plurality of light emitting devices disposed over the substrate;
an encapsulation layer disposed on the plurality of light emitting devices; and
a plurality of touch electrodes either disposed on or over the encapsulation layer, wherein each of the plurality of touch electrodes includes:
a mesh-type sensor metal having a plurality of openings;
a sensor transmission layer on the sensor metal; and
a sensor auxiliary metal on the sensor transmission layer,
wherein part of an incident light incident on an upper surface of the sensor auxiliary metal is reflected from the upper surface of the sensor auxiliary metal,
wherein another part of the incident light incident on the upper surface of the sensor auxiliary metal is reflected from an upper surface of the sensor metal after passing through the sensor auxiliary metal and the sensor transmission layer, and
wherein a phase difference between a first reflected light reflected from the upper surface of the sensor auxiliary metal and a second reflected light reflected from the upper surface of the sensor metal is an odd multiple of a half wavelength.

9. The transparent touch display device according to claim 8, wherein a wavelength of the incident light is $\lambda$, a refractive index of the sensor transmission layer is n, when an incident angle of the incident light is $\theta$, m is an integer greater than or equal to 0, then the sum of a thickness of the sensor auxiliary metal and a thickness of the sensor transmission layer, which is d, is set to satisfy the following equation:

$$\frac{2m+1}{2} \times \lambda = 2nd\ \cos\theta.$$

10. A transparent touch display device, comprising:
a substrate including a display area in which an image is displayed and a non-display area positioned outside the display area, the display area including a plurality of light emitting areas and a plurality of transmissive areas;
a plurality of light emitting devices disposed over the substrate;
an encapsulation layer disposed on the plurality of light emitting devices; and
a plurality of touch electrodes either disposed on or over the encapsulation layer, wherein each of the plurality of touch electrodes includes:
a mesh-type sensor metal having a plurality of openings;
a sensor transmission layer on the sensor metal; and
a sensor auxiliary metal on the sensor transmission layer,
wherein part of an incident light incident on an upper surface of the sensor auxiliary metal is reflected from the upper surface of the sensor auxiliary metal,
wherein another part of the incident light incident on the upper surface of the sensor auxiliary metal is reflected from an upper surface of the sensor metal after passing through the sensor auxiliary metal and the sensor transmission layer, wherein the plurality of touch electrodes include first to fourth touch electrodes, wherein the first touch electrode and the second touch electrode among the first to fourth touch electrodes are disposed adjacent to each other in either a column direction or a row direction, and are electrically connected to each other by a first bridge electrode, wherein the third touch electrode and the fourth touch electrode among the first to fourth touch electrodes are disposed adjacent to each other in either a row direction or a column direction, and are electrically connected to each other by a second bridge electrode, wherein the first bridge electrode and the second bridge electrode cross each other, the first bridge electrode is located on a layer different from the first to fourth touch electrodes, and the second bridge electrode is located on the same layer as the first to fourth touch electrodes, wherein the first bridge electrode includes a first bridge metal positioned on a layer different from the first touch electrode and the second touch electrode, an interlayer insulating layer is disposed between the first bridge metal and the first and second touch electrodes, and wherein part of the first bridge metal is electrically connected to the sensor metal of the first touch electrode through a first contact hole of the interlayer insulating layer, and another part of the first bridge metal is electrically connected to the sensor metal of the second touch electrode through a second contact hole of the interlayer insulating layer.

11. The transparent touch display device according to claim 10, wherein the second bridge electrode includes a second bridge metal, a second bridge transmission layer on the second bridge metal, and a second bridge auxiliary metal on the second bridge transmission layer, wherein the second bridge electrode overlaps a part of the first bridge electrode and is electrically separated from the first bridge electrode, and wherein the interlayer insulating layer is disposed between the second bridge electrode and the first bridge electrode, and is disposed between the first bridge metal of the first bridge electrode and the second bridge metal of the second bridge electrode.

12. The transparent touch display device according to claim 10, wherein the first bridge electrode further includes a first bridge transmission layer on the first bridge metal and a first bridge auxiliary metal on the first bridge transmission layer, wherein the second bridge electrode includes a second bridge metal, a second bridge transmission layer on the second bridge metal, and a second bridge auxiliary metal on the second bridge transmission layer, wherein the second bridge electrode overlaps a part of the first bridge electrode and is electrically separated from the first bridge electrode, and wherein the interlayer insulating layer is disposed between the second bridge electrode and the first bridge electrode, and is disposed between the first bridge auxiliary metal of the first bridge electrode and the second bridge metal of the second bridge electrode.

13. A transparent touch display device, comprising:

a substrate including a display area in which an image is displayed and a non-display area positioned outside the display area, the display area including a plurality of light emitting areas and a plurality of transmissive areas;

a plurality of light emitting devices disposed over the substrate;

an encapsulation layer disposed on the plurality of light emitting devices; and a plurality of touch electrodes either disposed on or over the encapsulation layer, wherein each of the plurality of touch electrodes includes:
a mesh-type sensor metal having a plurality of openings;
a sensor transmission layer on the sensor metal; and
a sensor auxiliary metal on the sensor transmission layer, wherein part of an incident light incident on an upper surface of the sensor auxiliary metal is reflected from the upper surface of the sensor auxiliary metal, wherein another part of the incident light incident on the upper surface of the sensor auxiliary metal is reflected from an upper surface of the sensor metal after passing through the sensor auxiliary metal and the sensor transmission layer, further comprising:
at least one dam located in a region where an outer inclined surface of the encapsulation layer ends;
a touch pad located in the non-display area and further outside the at least one dam; and
a touch routing wiring electrically connecting the touch electrodes to the touch pad, wherein the touch routing wiring includes a wiring metal that descends along the outer inclined surface of the encapsulation layer, passes an upper portion of the at least one dam, and is electrically connected to the touch pad.

14. The transparent touch display device according to claim 13, wherein the touch routing wiring further includes a wiring transmission layer on the wiring metal and a wiring auxiliary metal on the wiring transmission layer.

15. A transparent touch display device, comprising:

a display panel including a display area in which an image is displayed and a non-display area positioned outside the display area, wherein the display area includes a plurality of light emitting areas and a plurality of transmissive areas, and the display panel includes a plurality of subpixels corresponding to the plurality of light emitting areas, a plurality of data lines, a plurality of gate lines, and a plurality of touch electrodes;

a data driving circuit configured to drive the plurality of data lines;

a gate driving circuit configured to drive the plurality of gate lines; and a touch driving circuit configured to drive the plurality of touch electrodes, wherein each of the plurality of touch electrodes includes:
a mesh-type sensor metal having a plurality of openings;
a sensor transmission layer on the sensor metal; and
a sensor auxiliary metal on the sensor transmission layer, wherein part of an incident light incident on an upper surface of the sensor auxiliary metal is reflected from the upper surface of the sensor auxiliary metal, wherein another part of the incident light incident on the upper surface of the sensor auxiliary metal is reflected from an upper surface of the sensor metal after passing through the sensor auxiliary metal and the sensor transmission layer, wherein an area occupied by each of the plurality of touch electrodes includes a plurality of light emitting areas and a plurality of transmissive areas, wherein the sensor metal and the sensor auxiliary metal of each of the plurality of touch electrodes are disposed so as not to overlap with all of the plurality of light emitting areas and the plurality of transmissive areas, and wherein a plurality of openings formed in each of the plurality of touch electrodes includes a plurality of first openings corresponding to the plurality of light emitting areas and a plurality of second openings corresponding to the plurality of transmissive areas.

16. The transparent touch display device of claim 15 wherein:

wherein the sensor metal and the sensor auxiliary metal of each of the plurality of touch electrodes are disposed to not overlap a part of the plurality of light emitting areas and the plurality of transmissive areas.

* * * * *